(12) United States Patent
Fujiwara

(10) Patent No.: US 9,279,677 B2
(45) Date of Patent: Mar. 8, 2016

(54) CORRESPONDING POINT SEARCH DEVICE AND DISTANCE MEASUREMENT DEVICE

(75) Inventor: Koji Fujiwara, Mishima-gun (JP)

(73) Assignee: KONICA MINOLTA, INC., Tokyo (JP)

(*) Notice: Subject to any disclaimer, the term of this patent is extended or adjusted under 35 U.S.C. 154(b) by 278 days.

(21) Appl. No.: 14/127,373

(22) PCT Filed: May 10, 2012

(86) PCT No.: PCT/JP2012/061952
§ 371 (c)(1),
(2), (4) Date: Dec. 18, 2013

(87) PCT Pub. No.: WO2012/176556
PCT Pub. Date: Dec. 27, 2012

(65) Prior Publication Data
US 2014/0247344 A1 Sep. 4, 2014

(30) Foreign Application Priority Data
Jun. 24, 2011 (JP) .................... 2011-140659

(51) Int. Cl.
G01C 3/32 (2006.01)
G01C 3/06 (2006.01)
H04N 5/232 (2006.01)

(52) U.S. Cl.
CPC .. *G01C 3/32* (2013.01); *G01C 3/06* (2013.01); *H04N 5/23212* (2013.01); *H04N 5/23232* (2013.01)

(58) Field of Classification Search
None
See application file for complete search history.

(56) References Cited

U.S. PATENT DOCUMENTS

2007/0285672 A1 12/2007 Mukai et al.

FOREIGN PATENT DOCUMENTS

| JP | 11-223516 A | 8/1999 |
|----|-------------|--------|
| JP | 2007-327882 A | 12/2007 |
| JP | 2008-209275 | 9/2008 |

OTHER PUBLICATIONS

International Search Report in International Application No. PCT/JP2012/061952 mailed Jul. 31, 2012, 1 page.

*Primary Examiner* — Sath V Perungavoor
*Assistant Examiner* — Janese Duley
(74) *Attorney, Agent, or Firm* — Brinks Gilson & Lione

(57) ABSTRACT

A corresponding point search device includes an acquiring unit, a search unit and a determination unit. The acquiring unit acquires a first image obtained by imaging a subject with a first imaging apparatus in a focused state in which the first imaging apparatus is focused on the subject by moving of a movable portion, a second image obtained by imaging the subject with a second imaging apparatus and position information of the movable portion when the first imaging apparatus is in the focused state. The search unit searches for a corresponding point corresponding to a baseline point in one image in the other image for the one image and the other image of the first and second images. The determination unit determines the search range in which the corresponding point is searched by the search unit in the other image based on the position information.

10 Claims, 11 Drawing Sheets

F I G. 1
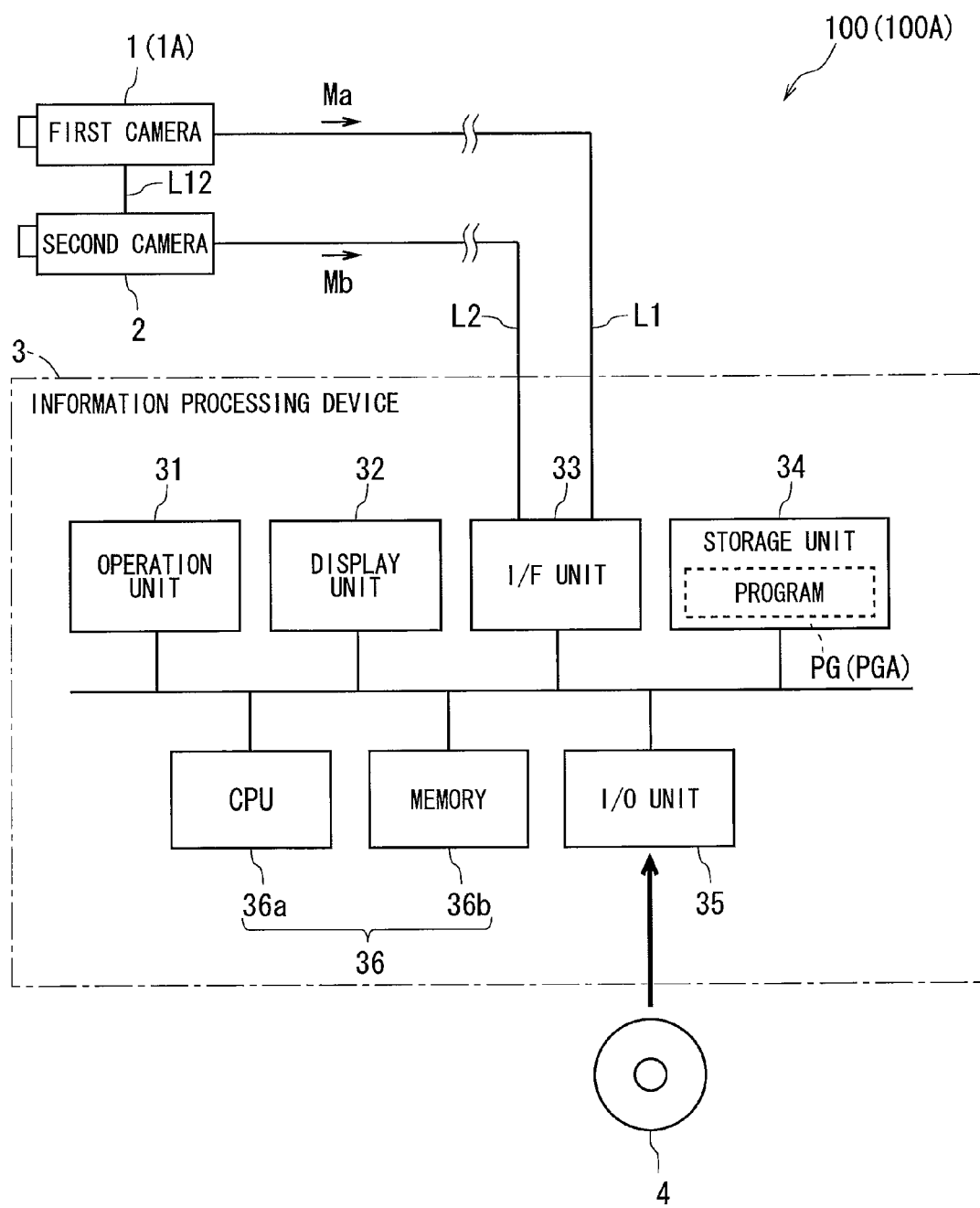

F I G. 9
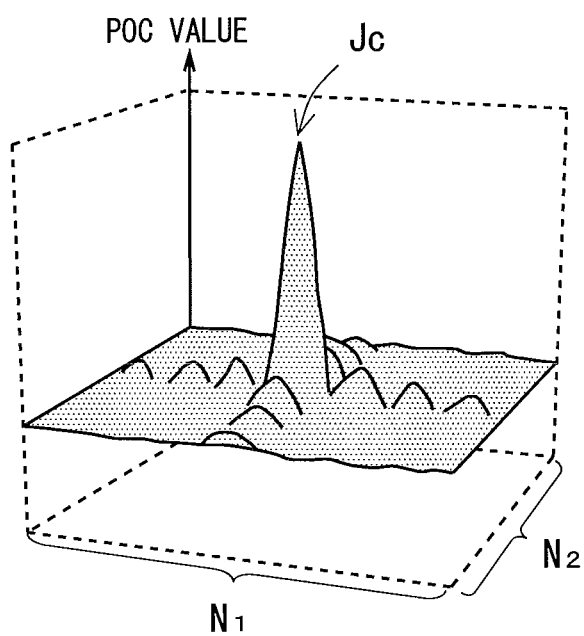

F I G. 1 0
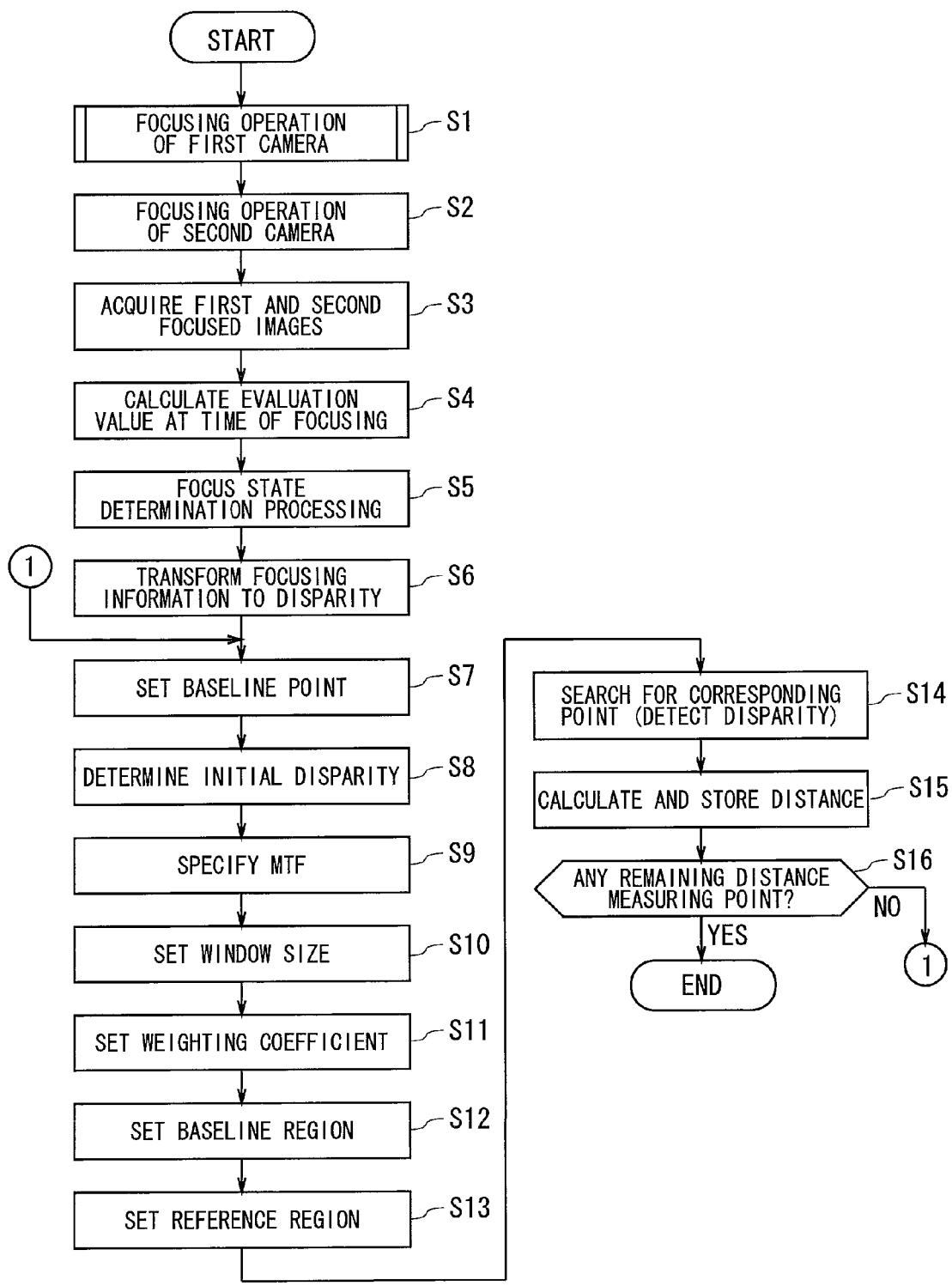

CORRESPONDING POINT SEARCH DEVICE AND DISTANCE MEASUREMENT DEVICE

TECHNICAL FIELD

The present invention relates to a technology of searching for a corresponding point between two or more images, and a technology of measuring a distance from an imaging apparatus to a subject.

BACKGROUND ART

A technology of searching for a corresponding point between a baseline image and a reference image obtained by imaging the same object (subject) with two imaging apparatuses from different view points, for the baseline image and the reference image is known. In this technology, for example, a disparity with respect to the same object is obtained based on a correlation degree by performing a correlation computation through SAD (Sum of Absolute Difference) computation method, or the like.

Furthermore, for example, a plurality of images having different resolutions are generated to obtain a hierarchical structure by resolution for the baseline image and the reference image, and processing in which the correlation computation is sequentially repeated from the upper level layer of lower resolution toward the lower level layer of higher resolution is known. In such processing, the time required for the computation processing to the lowermost layer having the highest resolution can be reduced since a search region in the next layer is set based on the disparity obtained in the upper level layer of lower resolution.

It is known that highly accurate computation results can be obtained regardless of disturbance, and the like by adopting a POC (Phase-Only Correlation) computation method in the search processing of the corresponding point. However, the processing amount of the computation including Fourier transformation, extraction of phase information, and the like is large in the POC computation method, which may lead to lowering in the operation efficiency, and the like due to longer processing time.

In the search processing of the corresponding point associated with each point, therefore, a technology of calculating the rough disparity through the SAD computation method, and setting the layer of the resolution in which the computation processing using the POC computation method is started and the search region based on the rough disparity is proposed (e.g., Japanese Patent Application Laid-Open No. 2008-209275, etc.). In this technology, the search processing of the corresponding point can be carried out at high precision and at high speed.

PRIOR ART DOCUMENT

Patent Document

Patent Document 1: Japanese Patent Application Laid-Open No. 2008-209275

However, in the technology of Japanese patent Application Laid-Open No. 2008-20, the computation amount of processing in which the rough disparity is obtained using the SAD computation method for the baseline image and the reference image is relatively large, which may lead to lowering in operation efficiency, and the like due to longer processing time.

Furthermore, if at least one of the baseline image and the reference image is blurred and becomes an unclear image, the detailed information of the image may be insufficient and the search precision of the corresponding point may lower. Such problem is significant when the subject widely includes an object, of which distance from the imaging apparatus is short, and an object, of which distance from the imaging apparatus is long.

In view of the problems described above, it is an object of the present invention to provide a technology with which the corresponding point can be searched at high precision and at high speed among a plurality of images, and a technology with which the distance from the imaging apparatus to the subject can be calculated at high precision and at high speed.

Means for Solving the Problems

To solve the problem described above, a corresponding point search device according to a first aspect includes an information acquiring unit that acquires a first image obtained by imaging a subject with a first imaging apparatus in a focused state, in which the first imaging apparatus is focused on the subject by moving of a movable portion including at least one of an optical system and an imaging unit, a second image obtained by imaging the subject with a second imaging apparatus from a view point different from the first imaging apparatus, and position information of the movable portion when the first imaging apparatus is in the focused state; a search unit that searches for a corresponding point corresponding to a baseline point in one image in the other image for the one image and the other image of the first image and the second image; and a search range determination unit that determines a search range in which the corresponding point is searched by the search unit in the other image based on the position information.

The corresponding point search device according to a second aspect relates to the corresponding point search device according to the first aspect, and further includes the first imaging apparatus, and the second imaging apparatus.

The corresponding point search device according to a third aspect relates to the corresponding point search device according to the first or second aspect, and further includes an evaluation value calculation unit that calculates an evaluation value at the time of focusing indicating a focusing degree of the first imaging apparatus with respect to the subject for one or more image regions in the focused image using data of the focused image obtained by the imaging unit when the first imaging apparatus is in the focused state; wherein the search range determination unit determines the search range based on the position information and the evaluation value at the time of focusing.

The corresponding point search device according to a fourth aspect relates to the corresponding point search device according to the third aspect, wherein the evaluation value calculation unit calculates a plurality of evaluation values indicating a focusing degree of the first imaging apparatus with respect to the subject using data of a plurality of images, each being obtained by the imaging unit in each state in which the movable portion is sequentially arranged at a plurality of positions; and a focusing control unit that sets the first imaging apparatus in the focused state by moving the movable portion based on the plurality of evaluation values is further arranged.

The corresponding point search device according to a fifth aspect relates to the corresponding point search device according to the third or fourth aspect, and further includes a function information specification unit that specifies information of an optical transfer function corresponding to the evaluation value at the time of focusing calculated by the evaluation value calculation unit from relational information indicating a relationship of the evaluation value at the time of focusing and the information of the optical transfer function associated with the optical system; wherein the search unit performs search processing of searching for the corresponding point based on a frequency component associated with a baseline region including the baseline point in the one image and a frequency component associated with a reference region in the other image, performs weighting for every frequency and performs computation according to the information of the optical transfer function specified by the function information specification unit in the search processing; and the search range includes the reference region in the other image.

The corresponding point search device according to a sixth aspect relates to the corresponding point search device according to the fifth aspect, wherein the evaluation value calculation unit calculates the evaluation value at the time of focusing indicating a focusing degree of the first imaging apparatus with respect to the subject for a plurality of image regions included in the focused image using data of the focused image; the function information specification unit specifies information of the optical transfer function corresponding to each evaluation value at the time of focusing calculated by the evaluation value calculation unit for each image region from the relational information; and the search unit performs the weighting for every frequency according to the information of the optical transfer function specified by the function information specification unit for at least one image region having a predetermined positional relationship with the baseline point of the plurality of image regions in the search processing.

The corresponding point search device according to a seventh aspect relates to the corresponding point search device according to the sixth aspect, wherein the predetermined positional relationship includes a positional relationship of being within a predetermined distance from the baseline point; at least one image region includes two or more image regions; and the search unit performs the weighting for every frequency according to the information of the optical transfer function in which high contrast is maintained up to the highest frequency of the information of the optical transfer function respectively specified by the function information specification unit for the two or more image regions in the search processing.

The corresponding point search device according to an eighth aspect relates to the corresponding point search device according to the third aspect, and includes a function information specification unit that specifies information of an optical transfer function corresponding to the evaluation value at the time of focusing calculated by the evaluation value calculation unit from relational information indicating a relationship of the evaluation value at the time of focusing and the information of the optical transfer function associated with the optical system; wherein the search unit searches for the corresponding point based on a frequency component associated with a baseline region including the baseline point in the one image and a frequency component associated with a reference region in the other image; the search range includes the reference region of the other image; and the search range determination unit determines sizes of the baseline region and the reference region according to the information of the optical transfer function specified by the function information specification unit.

The corresponding point search device according to a ninth aspect relates to the corresponding point search device according to any one of the third to fifth aspects, wherein the evaluation value calculation unit calculates an evaluation value at the time of focusing indicating a focusing degree of the first imaging apparatus with respect to the subject for a plurality of image regions included in the focused image using data of the focused image; and the search range determination unit determines the search range based on the evaluation value at the time of focusing calculated by the evaluation value calculation unit for at least one image region having a predetermined positional relationship with the baseline point of the plurality of image regions, and the position information.

The corresponding point search device according to a tenth aspect relates to the corresponding point search device according to the ninth aspect, wherein the predetermined positional relationship includes a positional relationship of being within a predetermined distance from the baseline point; at least one image region includes two or more image regions; and the search range determination unit obtains two or more disparity candidates between the baseline point in the one image and the corresponding point in the other image based on the evaluation value at the time of focusing calculated by the evaluation value calculation unit for the two or more image regions and the position information, and determines the search range based on a smallest disparity candidate of the two or more disparity candidates.

The corresponding point search device according to an eleventh aspect relates to the corresponding point search device according to any one of the third to fifth aspects, wherein the evaluation value calculation unit calculates an evaluation value at the time of focusing indicating a focusing degree of the first imaging apparatus with respect to the subject for a plurality of image regions included in the focused image using data of the focused image; and the search range determination unit determines the search range based on a representative value related to the plurality of evaluation values at the time of focusing calculated by the evaluation value calculation unit for the plurality of image regions and the position information.

A distance measurement device according to a twelfth aspect includes the corresponding point search device according to any one of the first to eleventh aspects, and a distance calculation unit, arranged inside or outside the corresponding point search device, that calculates a distance from the first and second imaging apparatuses to a portion captured at the baseline point in the subject based on a shift amount between a position of the baseline point in the one image and a position of the corresponding point in the other image, and a parameter associated with the setting of the first and second imaging apparatuses.

Effects of the Invention

According to the corresponding point search device of the first to eleventh aspects as well, the corresponding point can be searched at high precision and at high speed among a plurality of images since the search range of the corresponding point is determined based on the position information of the movable portion at the time of focusing of the imaging apparatus.

According to the corresponding point search device of the third aspect, the search range is made more appropriate since the search range of the corresponding point is determined based on the focusing degree of the imaging apparatus and the position information of the movable portion at the time of focusing. As a result, the corresponding point can be searched at higher precision and higher speed among the plurality of images.

According to the corresponding point search device of the fourth aspect, the corresponding point can be searched at high precision and at high speed among the plurality of images even if the imaging apparatus having a general purpose auto-focus adjustment function is used. Therefore, the reduction in the manufacturing cost and the miniaturization of the corresponding point search device, for example, can be achieved.

According to the corresponding point search device of the fifth aspect, the enhancement of the search precision of the corresponding point due to the improvement of the S/N ratio, and the increase in speed of the search of the corresponding point due to the reduction of the computation amount can be achieved.

According to the corresponding point search device of the sixth aspect, the enhancement of the search precision of the corresponding point due to the improvement of the S/N ratio, and the increase in speed of the search of the corresponding point due to the reduction of the computation amount can be achieved not uniformly but for every region where the baseline point is positioned.

According to the corresponding point search device of the seventh aspect, the balance between the improvement of the S/N ratio and the reduction in the amount of information to use in the computation can be adjusted. In other words, the enhancement of the search precision of the corresponding point due to the improvement of the S/N ratio and the increase in speed of the search of the corresponding point due to the reduction of the computation amount can be made more appropriate.

According to the corresponding point search device of the eighth aspect, the search precision of the corresponding point can be maintained by ensuring the amount of information.

According to the corresponding point search device of the ninth aspect, the search range can be more appropriately determined not uniformly but for every region where the baseline point is positioned. As a result, the search precision of the corresponding point can be appropriately maintained by ensuring the amount of information for every region.

According to the corresponding point search device of the tenth aspect, the search range greatly deviated from the corresponding point is less likely to be set, and hence the search precision of the corresponding point stabilizes.

According to the corresponding point search device of the eleventh aspect, the corresponding point can be searched at high speed among the plurality of images due to the reduction in the computation amount.

According to the distance measurement device of the twelfth aspect, the corresponding point can be searched at high precision and at high speed among the plurality of images, and as a result, the distance from the imaging apparatus to the subject can be calculated at high precision and at high speed.

BRIEF DESCRIPTION OF DRAWINGS

FIG. 1 is a view showing a configuration example of a distance measurement device according to one embodiment and one variant.

FIG. 9 is a view illustrating a distribution of POC values.

FIG. 10 is a flowchart illustrating a flow of a distance measuring operation according to one embodiment.

EMBODIMENT FOR CARRYING OUT THE INVENTION

Figure 2:
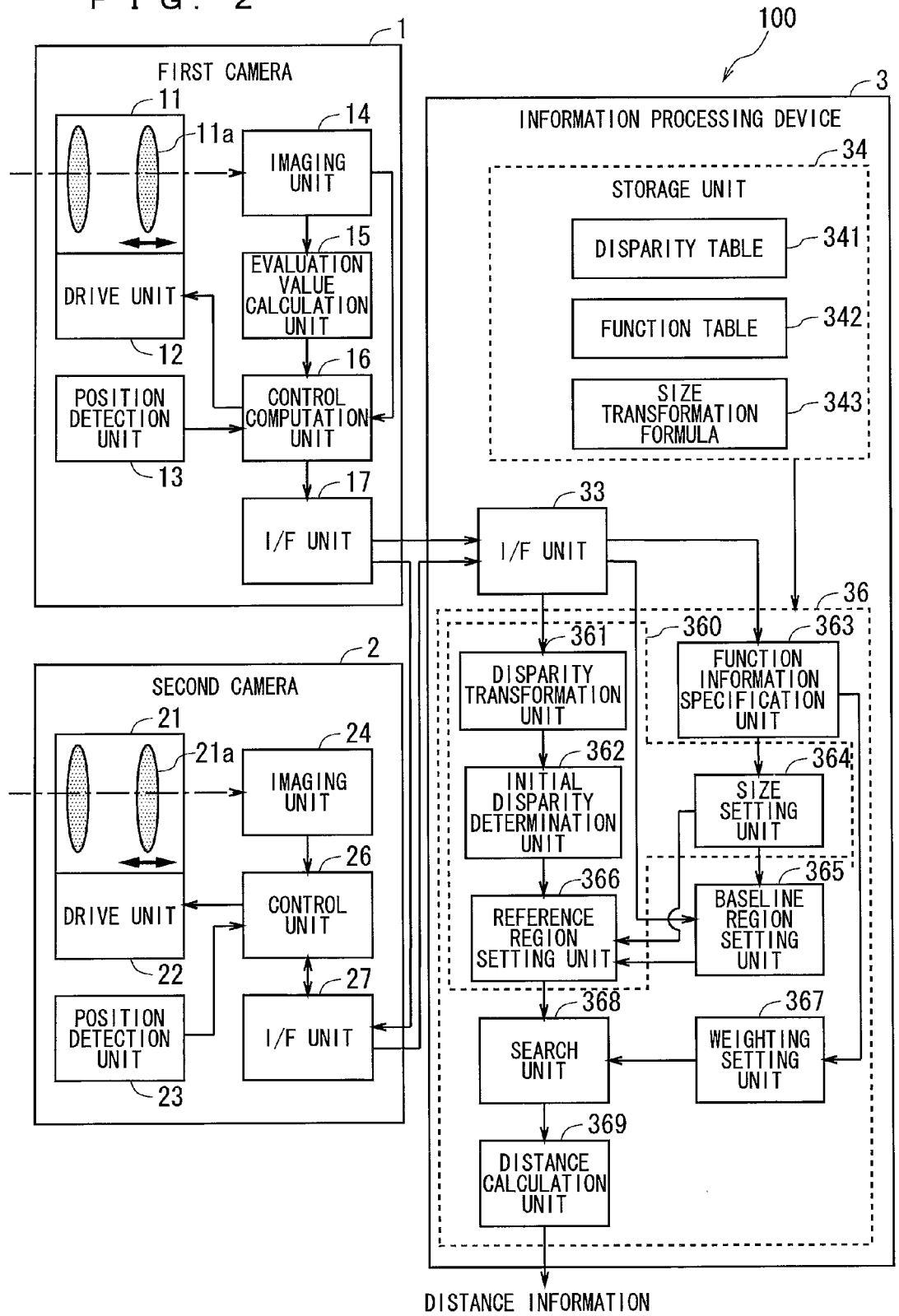
FIG. 2 is a block diagram illustrating a functional configuration of the distance measurement device according to one embodiment.

One embodiment of the present invention will be hereinafter described based on the drawings. In the drawings, the same reference numbers are denoted on the portions having similar configurations and functions, and redundant description will be omitted in the description made below. The drawings are schematically shown, and the sizes, positional relationships and the like of the various structures in each drawing are not accurately illustrated.

<(1) Schematic Configuration of Distance Measurement Device>

FIG. 1 is a view showing a schematic configuration of a distance measurement device 100 according to one embodiment. The distance measurement device 100 includes a first camera 1, a second camera 2, and an information processing device 3.

The first camera 1 and the second camera 2 are connected through a communication line L12 in a data transmittable manner. The first camera 1 is connected to the information processing device 3 through a communication line L1 in a data transmittable manner, and the second camera 2 is connected to the information processing device 3 through a communication line L2 in a data transmittable manner. The communication lines L1, L2, and L12 may be wired lines or wireless lines.

The first and second cameras 1, 2 are imaging apparatuses for acquiring images by imaging a subject. The first and second cameras 1, 2 are arranged side by side in one direction. The one direction herein may be, for example, a horizontal direction. If the one direction is the horizontal direction, an optical axis of an imaging lens of the first camera 1 and an optical axis of an imaging lens of the second camera 2 are arranged spaced apart in the horizontal direction. The separation distance of the optical axis of the imaging lens of the first camera 1 and the optical axis of the imaging lens of the second camera 2 is a base length associated with the first and second cameras 1, 2.

The first and second cameras 1, 2, for example, image a subject positioned in front of the camera from viewpoints different from each other at the same timing. The two images imaged at the same timing by the first and second cameras 1, 2 are a so-called stereo image. That is, the stereo image includes an image (also referred to as first image) acquired by the imaging of the first camera 1, and an image (also referred to as second image) acquired by the imaging of the second camera 2. Data Ma associated with the first image and data Mb associated with the second image can be transmitted from the first and second cameras 1, 2 to the information processing device 3 through the communication lines L1, L2.

The information processing device 3, for example, may be a personal computer, and includes an operation unit 31, a display unit 32, an interface (I/F) unit 33, a storage unit 34, an input/output (I/O) unit 35, and a control unit 36.

The operation unit 31 includes, for example, a mouse and a keyboard. The display unit 32 includes, for example, a liquid crystal display. The I/F unit 33, for example, carries out data exchange between the first and second cameras 1, 2 and the information processing device 3. The storage unit 34 includes, for example, a hard disc, and the like, and stores a program PG and various types of data. The I/O unit 35 includes, for example, a disc drive, and receives a storage medium 4 such as an optical disk, and the like to carry out data exchange between the storage medium 4 and the control unit 36. The control unit 36 includes, for example, a CPU 36a that operates as a processor, and a memory 36b that temporarily stores information. The control unit 36 realizes various functions, information processing, and the like by reading and executing the program PG stored in the storage unit 34.

In the present embodiment, the aberration of the first and second cameras 1, 2 is satisfactorily corrected, and the first and second cameras 1, 2 are set to be substantially parallel (preferably exactly parallel) to simplify the explanation. That is, the optical axes of the first and second cameras 1, 2 are set to be substantially parallel (preferably exactly parallel), and the subject captured in the first and second images have substantially the same angular relationship (preferably exactly the same angular relationship) with respect to the outer edges of the first and second images. However, if the actual first and second cameras 1, 2 are not under such conditions, the images need to be converted to the stereo images viewed the same as the images imaged under the same conditions through image processing.

<(2) Functional Configuration of Distance Measurement Device>

FIG. 2 is a block diagram showing a functional configuration of the main units of the distance measurement device 100 according to the present embodiment. In FIG. 2, the functional configuration related to the operation (also referred to as distance measuring operation) of measuring the distance from the first and second cameras 1, 2 to the subject is shown.

<(2-1) Functional Configuration of First Camera>

The first camera 1 serving as a first imaging apparatus includes an optical system 11, a drive unit 12, a position detection unit 13, an imaging unit 14, an evaluation value calculation unit 15, a control computation unit 16, and an interface (I/F) unit 17.

The optical system 11 includes, for example, a plurality of optical lenses. The plurality of optical lenses is optical members formed by glass, plastic, or the like. Furthermore, the plurality of optical lenses includes one or more optical lenses serving as a movable portion that is movable in an optical axis direction of the optical system 11 with respect to a main body of the first camera 1. The subject can be focused by moving the one or more optical lenses (also referred to as focusing lens) 11a serving as the movable portion with the drive force of the drive unit 12.

The drive unit 12 may to be an actuator using a piezoelectric element, and the like, for example. The drive unit 12 generates the drive force in response to a control signal from the control computation unit 16, and moves the focusing lens 11a in the optical axis direction. When an automatic focus adjustment (also referred to as AF adjustment) is carried out in the first camera 1, the focusing lens 11a is sequentially arranged at a plurality of positions for focusing (also referred to as AF position) by the drive unit 12. The position of the focusing lens 11a when the first camera 1 is focused on the subject is thereby detected. The plurality of AF positions includes, for example, positions where the focusing lens 11a is moved by a predetermined distance toward one direction from an initial position in a movable range of the focusing lens 11a. The initial position may be one end of the movable range of the focusing lens 11a, for example, and the one direction may be a direction from the one end toward the other end of the movable range of the focusing lens 11a, for example.

The position detection unit 13 may be, for example, an electromagnetic sensor, or the like. The position detection unit 13 detects the position in the optical axis direction of the focusing lens 11a in the movable range of the focusing lens 11a. The information (also referred to as position information) indicating the position of the focusing lens 11a detected by the position detection unit 13 is transmitted to the control computation unit 16.

The imaging unit 14 includes, for example, an imaging element such as a CCD. The imaging unit 14 receives light from the subject through the optical system 11, and images the subject to acquire a first image in which the subject is captured.

Specifically, when the AF adjustment is carried out in the first camera 1, the imaging unit 14 images the subject and acquires a plurality of images for AF adjustment (also referred to as AF image) in each state in which the focusing lens 11a is sequentially arranged at the plurality of AF positions by the drive unit 12. Furthermore, the imaging unit 14 also acquires an image (also referred to as first focused image) in which the subject is captured by imaging the subject in a state (also referred to as focused state) in which the first camera 1 is focused on the subject. The data of the first image including the AF image and the first focused image acquired by the imaging unit 14 is transmitted to the evaluation value calculation unit 15 and the control computation unit 16.

The evaluation value calculation unit 15 may be configured by a dedicated electronic circuit, for example, or may be functionally realized by executing software with a processor. The evaluation value calculation unit 15 calculates an evaluation value indicating a degree (also referred to as focusing degree) at which the first camera 1 is focused on the subject using the data of the first image. The evaluation value may be a value indicating contrast (also referred to as contrast value), for example. The contrast value can be calculated, for example, by extracting a high frequency component of the data of the first image, aligning the positive and negative components of the signal of the high frequency component in the same direction and integrating the same with a digital filter functioning as a high pass filter, a wave detection circuit, and an integration circuit.

Figure 3:
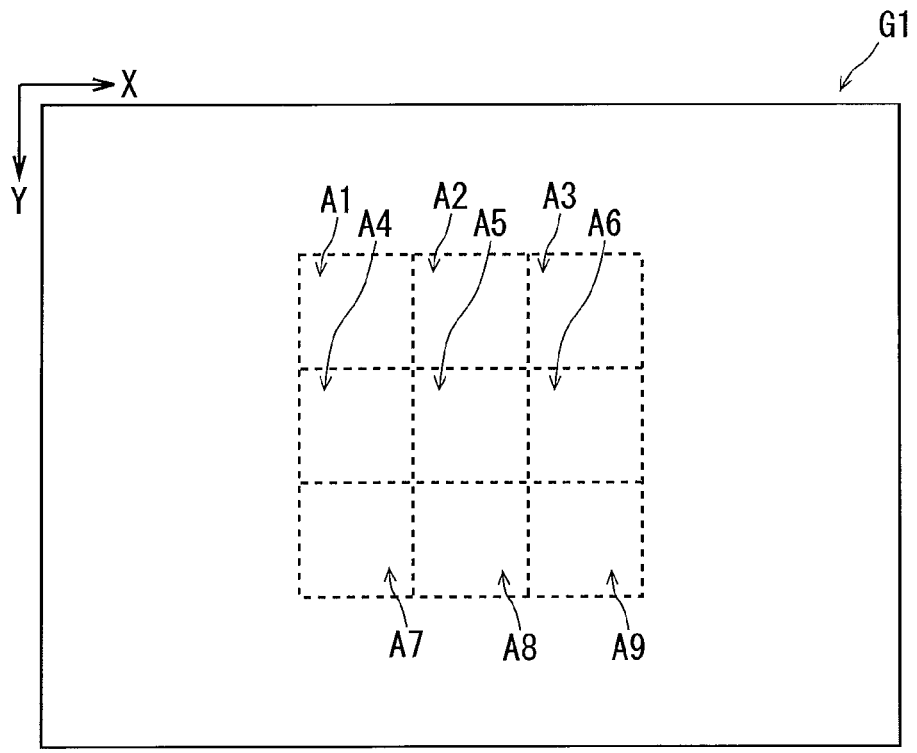
FIG. 3 is a view illustrating regions where evaluation values are calculated in one image.

As shown in FIG. 3, for example, the evaluation value is calculated for each of a predetermined number of regions included in a first image G1 in the evaluation value calculation unit 15. The predetermined number is set to nine herein, and the evaluation value is calculated for first to ninth image regions A1 to A9 near the middle of the first image G1.

Specifically, when the AF adjustment is carried out, the evaluation value calculation unit 15 calculates the evaluation value for each image region A1 to A9 based on the data of each AF image. In this case, for example, the evaluation value calculation unit 15 calculates the evaluation value for AF adjustment (also referred to as AF evaluation value) according to a predetermined rule from the plurality of evaluation values for the first to ninth image regions A1 to A9 with respect to the data of each AF image. The predetermined rule may be a rule for calculating an average value of the plurality of evaluation values for the first to ninth image regions A1 to A9, for example. The evaluation value calculation unit 15 also calculates the evaluation value (also referred to as evaluation value at the time of focusing) for each image region A1 to A9 included in the first focused image using the data of the first focused image.

The control computation unit 16 may be configured by a dedicated electronic circuit, for example, or may be functionally realized by executing software with a processor. The control computation unit 16 serving as a focusing control unit carries out the AF adjustment of so-called hill climbing method. Specifically, when the AF adjustment is carried out, the control computation unit 16 moves the focusing lens 11a based on the plurality of AF evaluation values calculated by the evaluation value calculation unit 15 to set the first camera 1 in the focused state.

Specifically, the control computation unit 16 moves the focusing lens 11a while acquiring the position information of the focusing lens 11a from the position detection unit 13 to sequentially move the focusing lens 11a to the plurality of AF positions. In this case, the control computation unit 16 acquires the AF evaluation value from the evaluation value calculation unit 15 when the focusing lens 11a is moved to each AF position, thus acquiring the AF evaluation value for each position information. If each AF evaluation value is the contrast value, for example, the position (also referred to as focusing lens position) of the focusing lens 11a corresponding to the peak of the contrast value is calculated in the control computation unit 16. The first camera 1 is set to the focused state when the focusing lens 11a is moved to the focusing lens position according to the control of the control computation unit 16.

Furthermore, when the first camera 1 is set to the focused state, the control computation unit 16 performs processing (also referred to as focus state determination processing) of determining whether each of the first to ninth image regions A1 to A9 is in a front focus state or a rear focus state. The front focus state is a state in which the focus of the first camera 1 is in a short-distance view than the subject, and the rear focus state is a state in which the focus of the first camera 1 is in a long-distance view than the subject. When the AF adjustment is carried out, for example, the respective focus state determination processing of the first to ninth image regions A1 to A9 of when the first camera 1 is in the focused state is carried out in the control computation unit 16 based on the evaluation values calculated for the first to ninth image regions A1 to A9 of the AF images acquired in each state in which the focusing lens 11a is arranged at each AF position.

Furthermore, the control computation unit 16 receives the data indicating the evaluation value at the time of focusing associated with the first to ninth image regions A1 to A9 from the evaluation value calculation unit 15, and receives the data of the first focused image from the imaging unit 14. The control computation unit 16 transmits the data indicating the evaluation value at the time of focusing associated with the first to ninth image regions A1 to A9, the information (also referred to as front/rear focus information) indicating the determination result of the focus state determination processing, and the data of the first focused image to the information processing device 3 through the I/F unit 17. The control computation unit 16 also transmits the information of the focusing lens position (also referred to as focusing position information) to the second camera 2 and the information processing device 3 through the I/F unit 17.

<(2-2) Functional Configuration of Second Camera>

The second camera 2 serving as a second imaging apparatus includes an optical system 21, a drive unit 22, a position detection unit 23, an imaging unit 24, a control unit 26, and an interface (I/F) unit 27.

The optical system 21 has a configuration similar to the optical system 11, for example. Specifically, in the optical system 21, the subject can be focused by moving one or more optical lenses (focusing lenses) 21a serving as the movable portion with the drive force of the drive unit 22.

The drive unit 22 may be an actuator using a piezoelectric element, and the like, for example, similar to the drive unit 12. The drive unit 22 generates the drive force in response to a control signal from the control unit 26, and moves the focusing lens 21a in the optical axis direction.

The position detection unit 23 may be, for example, an electromagnetic sensor, or the like, similar to the position detection unit 13. The position detection unit 23 detects the position in the optical axis direction of the focusing lens 21a in the movable range of the focusing lens 21a. The information (position information) indicating the position of the focusing lens 21a detected by the position detection unit 23 is transmitted to the control unit 26.

The imaging unit 24 includes, for example, an imaging element such as a CCD, similar to the imaging unit 14. The imaging unit 24 receives light from the subject through the optical system 21, and images the subject to acquire a second image in which the subject is captured. Specifically, the imaging unit 24 acquires an image (also referred to as second focused image) in which the subject is captured by imaging the subject in a focused state in which the second camera 2 is focused on the subject. The data of the second focused image acquired by the imaging unit 24 is transmitted to the control unit 26.

The control unit 26 may be configured by a dedicated electronic circuit, for example, or may be functionally realized by executing software with a processor. The control unit 26 acquires the focusing position information from the first camera 1 through the I/F unit 27. The control unit 26 then controls the drive unit 22 while referencing the position information obtained from the position detection unit 23 to move the focusing lens 21a to the focusing lens position corresponding to the focusing position information of the first camera 1. The second camera 2 can be thereby set to the focused state.

The control unit 26 also receives data of the second focused image from the imaging unit 24. The control unit 26 then transmits the data of the second focused image to the information processing device 3 through the I/F unit 27.

<(2-3) Functional Configuration of Information Processing Device>

As described above, the information processing device 3 includes the I/F unit 33, the storage unit 34, and the control unit 36.

As shown in FIG. 2, the I/F unit 33 operates as a portion (also referred to as information acquiring unit) that acquires information from the first and second cameras 1, 2. For example, the I/F unit 33 acquires the data of the first focused image, the data indicating the evaluation values at the time of focusing and the front/rear focus information associated with the first to ninth image regions A1 to A9, and the focusing position information from the first camera 1, and acquires the data of the second focused image from the second camera 2. The I/F unit 33 then transmits the data of the first and second focused images, the data indicating the evaluation values at the time of focusing and the front/rear focus information associated with the first to ninth image regions A1 to A9, and the focusing position information input from the first camera 1 to the control unit 36.

The storage unit 34 stores, for example, a disparity table 341, a function table 342, and a size transformation formula 343.

The disparity table 341 is a table in which a relationship of the focusing information related to the focusing of the first camera 1 and the disparity is described. The focusing information may be information indicating a combination of the focusing position information regarding the first camera 1, and the data indicating the evaluation values at the time of focusing and the front/rear focusing information with respect to the first to ninth image regions A1 to A9, for example. The disparity corresponds to a shift amount of a position where the same portion of the subject is captured between the first focused image and the second focused image.

The disparity table 341 can be obtained in advance, for example, through optical simulations using optical design values of the first and second cameras 1, 2. The disparity table 341 may, for example, also be obtained in advance through experiments. In such experiments, the information of the disparity table 341 can be obtained by actually obtaining the focusing information when the positional relationship of the first and second cameras 1, 2 and the subject is known.

Figure 4:
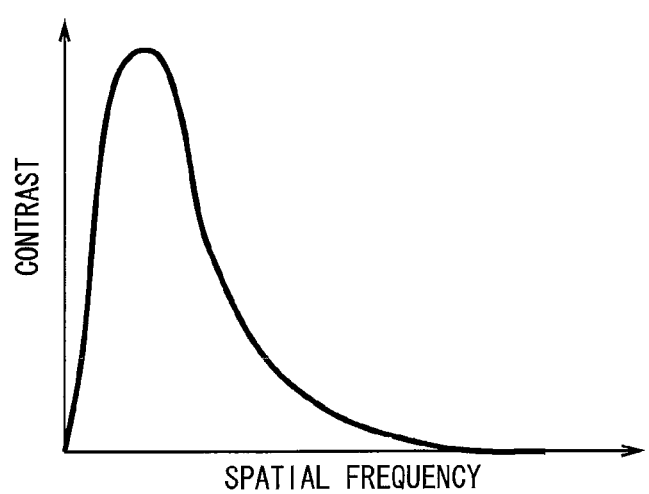
FIG. 4 is a graph illustrating a relationship of the spatial frequency and the contrast with respect to the MTF.

The function table 342 is a table indicating an MTF (Modulation Transfer Function) included in a spatial transfer function. The MTF is one of the indices for evaluating the lens performance, and represents to what extent the contrast of the subject can be accurately reproduced as spatial frequency characteristic to know the imaging performance of the lens, where the spatial frequency is represented on a horizontal axis and the contrast is represented on a vertical axis, as shown in FIG. 4. Generally, the lens has clearer resolution the higher the contrast of low frequency (left side in the graph of FIG. 4), and the lens has higher resolution the higher the contrast of high frequency (right side in the graph of FIG. 4).

The function table 342 also describes information indicating the MTF for every evaluation value at the time of focusing. That is, the information (also referred to as relational information) indicating the relationship of the evaluation values at the time of focusing and the MTF serving as the information of the optical transfer function associated with the optical systems 11, 21 are described in the function table 342. The function table 342 can be obtained in advance, for example, through optical simulations using optical design values of the first and second cameras 1, 2.

The size transformation formula 343 is a formula for transforming the cutoff frequency of the MTF to a size of a window (also referred to as search window) for defining the search range of the corresponding point. In the MTF shown in FIG. 4, the cutoff frequency of the MTF refers to the spatial frequency in which the contrast becomes lower than a predetermined contrast, the contrast reducing as the spatial frequency becomes higher. For example, the size transformation formula 343 indicates $L=(k/f)$, where f is the cutoff frequency, k is the predetermined constant, and L is the length of one side of the square search window.

The unit of the cutoff frequency is (1/pixel). If a maximum value (also referred to as maximum contrast value) of the contrast is one, a predetermined contrast may be a value obtained by multiplying a predetermined number to the maximum contrast value, for example. The predetermined value may be any one of 0.5, 0.6, 0.8, for example. The size transformation formula 343 may be a table described with the information in which the cutoff frequency of the MTF and the size of the search window are associated.

The control unit 36 includes, as a functional configuration, a disparity transformation unit 361, an initial disparity determination unit 362, a function information specification unit 363, a size setting unit 364, a baseline region setting unit 365, a reference region setting unit 366, a weighting setting unit 367, a search unit 368, and a distance calculation unit 369.

The disparity transformation unit 361 transforms the focusing information to disparity according to the disparity table 341. In the disparity transformation unit 361, the disparity corresponding to the focusing information obtained from the first camera 1 is recognized from the disparity table 341.

The initial disparity determination unit 362 determines an initial value (also referred to as initial disparity) of the disparity in the search processing of the corresponding point between the first focused image G1 and the second focused image G2 based on the disparity recognized by the disparity transformation unit 361 for each image region A1 to A9.

Figure 5:
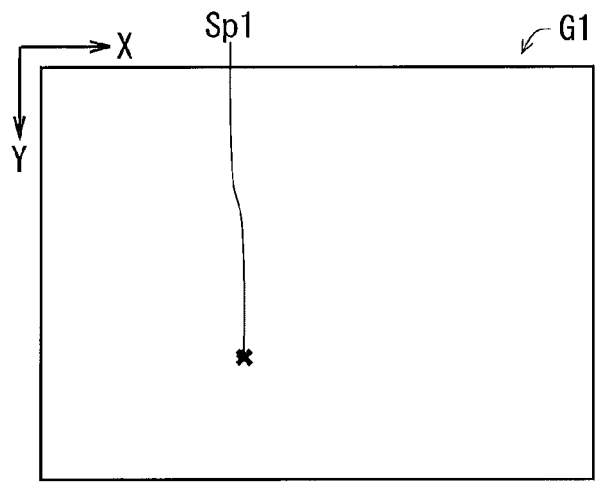
FIG. 5 is a view illustrating a setting mode of a baseline point with respect to a baseline image.

Specifically, the first focused image G1 is first set as one image (also referred to as baseline image) that becomes a reference when searching for the corresponding point, and a pixel (also referred to as baseline point) Sp1 that becomes a reference when searching for the corresponding point is set in the baseline image G1, as shown in FIG. 5. For example, consideration can be made to a mode in which the pixel at the upper left of the baseline image G1 is first set as the baseline point Sp1, and then all the pixels included in the baseline image G1 are sequentially set.

If the baseline point Sp1 is included in the first to ninth image regions A1 to A9 in the baseline image G1, the disparity obtained by the disparity transformation unit 361 for the image region including the baseline point Sp1 of the first to ninth image regions A1 to A9 is determined as the initial disparity associated with the baseline point Sp1. That is, the initial disparity is determined in view of not only the focusing position of the first camera 1 but also the front/rear focus information for each of the first to ninth image regions A1 to A9. If the baseline point Sp1 is positioned in the vicinity of the boundary of the first to ninth image regions A1 to A9, for example, the minimum value or the maximum value of the disparities obtained by the disparity transformation unit 361 for a plurality of image regions contacting the boundary of the first to ninth image regions A1 to A9 may be determined as the initial disparity. If the baseline point Sp1 is not included in the first to ninth image regions A1 to A9, for example, the disparity obtained by the disparity transformation unit 361 for an image region closest from the baseline point Sp1 of the first to ninth image regions A1 to A9 is determined as the initial disparity associated with the baseline point Sp1.

The function information specification unit 363 specifies the MTF serving as the information of the optical transfer function corresponding to the evaluation value at the time of focusing from the function table 342. Here, the MTF (also referred to as representative MTF) corresponding to the representative value of the evaluation value obtained from the evaluation values at the time of focusing associated with the first to ninth image regions A1 to A9 is specified, for example. The representative value of the evaluation value may be an average value, or an average value of the top N evaluations for the evaluation values at the time of focusing associated with the first to ninth image regions A1 to A9, for example. The function information specification unit 363 may, for example, specify the $n^{th}$ MTF corresponding to the evaluation value at the time of focusing for each $n^{th}$ image region An (n is an integer between one and nine).

The size setting unit 364 sets the size of the search window according to the MTF specified by the function information specification unit 363. The search window includes a baseline region set by the baseline region setting unit 365, and a reference region set by the reference region setting unit 366. In the size setting unit 364, the size of the search window can be set based on the cutoff frequency of the representative MTF and the size transformation formula 343, for example. The amount of information that may be insufficient according to the MTF is ensured by the setting of the size of the search window corresponding to the MTF, and the search precision of the corresponding point can be maintained.

In the size setting unit 364, the size of the search window may be set for each image region An based on the cutoff frequency of the $n^{th}$ MTF and the size transformation formula 343 described above. For example, if the baseline point Sp1 is included in the $n^{th}$ image region An, the size of the search window for the $n^{th}$ image region An can be set based on the cutoff frequency of the $n^{th}$ MTF specified for the $n^{th}$ image region An and the size transformation formula 343. Furthermore, for example, if the baseline point Sp1 is positioned in the vicinity of the boundary of the first to ninth image regions A1 to A9, the size of the search window can be set based on the cutoff frequencies of the MTFs specified for a plurality of image regions contacting the boundary of the first to ninth image regions A1 to A9 and the size transformation formula 343. In this case, for example, the size of the search window can be set based on the minimum value or the maximum value of the cutoff frequencies of the MTFs specified for the plurality of image regions contacting the boundary, and the size transformation formula 343. Moreover, for example, if the baseline point Sp1 is not included in the first to ninth image regions A1 to A9, the size of the search window can be set based on the cutoff frequency of the MTF specified for the $n^{th}$ image region An closest from the baseline point Sp1 of the first to ninth image regions A1 to A9, and the size transformation formula 343.

Figure 6:
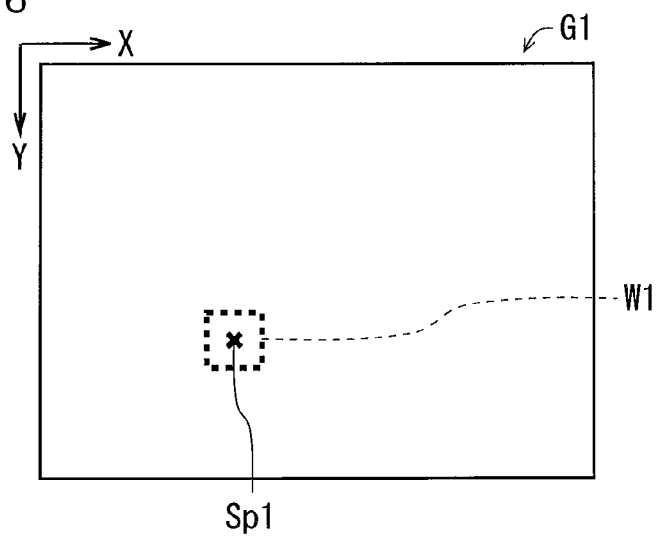
FIG. 6 is a view illustrating a setting mode of a baseline region with respect to the baseline image.

The baseline region setting unit 365 sets the search window (also referred to as baseline region) that becomes a reference in the baseline image G1. Specifically, as shown in FIG. 6, a baseline region W1 including the baseline point Sp1 is set with the baseline point Sp1 as the reference. The size of the baseline region W1 may be set by the size setting unit 364. The baseline region W1, for example, is also set with the baseline point Sp1 as the center. In this case, the baseline region W1 is defined by the baseline point Sp1.

Figure 7:
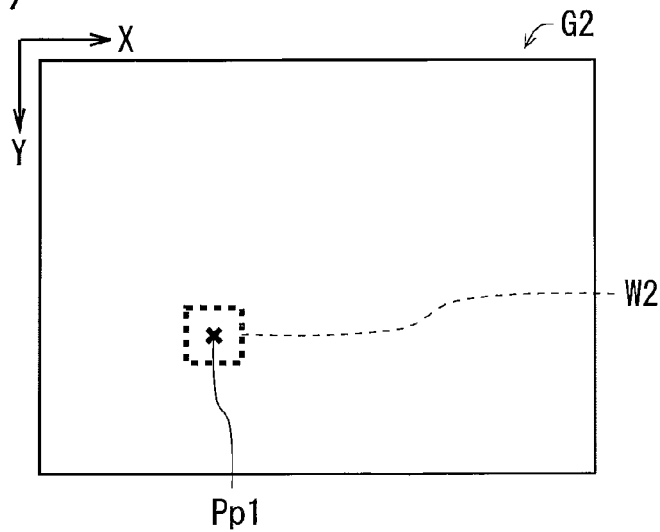
FIG. 7 is a view illustrating a setting mode of a reference region with respect to a reference image.

The reference region setting unit 366 sets the second focused image G2 as the other image (also referred to as reference image) referenced at the time of searching for the corresponding point, and sets the search window (also referred to as reference region) defining the target of reference in the reference image G2. Specifically, as shown in FIG. 7, a pixel (also referred to as reference point) Pp1 that becomes a baseline of reference at the time of searching for the corresponding point is set in the reference image G2. Then, as shown in FIG. 7, a reference region W2 including the reference point Pp1 is set with the reference point Pp1 as the reference.

The shift amount between the position of the reference point Pp1 in the reference image G2 and the position of the baseline point Sp1 in the baseline image G1 is set based on the initial disparity determined by the initial disparity determination unit 362. For example, the shift amount and the initial disparity are to coincide. Furthermore, the size of the reference region W2 may be set by the size setting unit 364, similar to the size of the baseline region W1. Moreover, the reference region W2 is set with the reference point Pp1 as the center, for example. In this case, the reference region W2 is defined by the reference point Pp1.

The reference region W2 is a range (also referred to as search range) in which the corresponding point corresponding to the baseline point Sp1 is searched in the reference image G2 by the search unit 368. The search range is determined based on the focusing information by the disparity transformation unit 361, the initial disparity determination unit 362, the size setting unit 364, and the reference region setting unit 366. In other words, the disparity transformation unit 361, the initial disparity determination unit 362, the size setting unit 364, and the reference region setting unit 366 operate as a portion (also referred to as search range determination unit) 360 for determining the search range. The search range when searching for the corresponding point of each baseline point Sp1 can be determined by the initial disparity determination unit 362 based on the evaluation values at the time of focusing associated with one or more image regions having a predetermined positional relationship with each baseline point Sp1 of the first to ninth image regions A1 to A9, and the focusing position information. The predetermined positional relationship may be a positional relationship closest from the baseline point Sp1 of the first to ninth image regions A1 to A9, for example.

The weighting setting unit 367 sets a weighting coefficient for every spatial frequency according to the MTF specified by the function information specification unit 363. The weighting coefficient is to be set for every spatial frequency according to the MTF specified for one or more image regions having a predetermined positional relationship with each baseline point Sp1 of the first to ninth image regions A1 to A9, for example. The predetermined positional relationship may be a positional relationship in which the baseline point Sp1 is included or a closest positional relationship of the first to ninth image regions A1 to A9, for example. For example, the contrast of each spatial frequency in the MTF can be respectively set as the weighting coefficient of the corresponding spatial frequency.

The search unit 368 searches for the corresponding point corresponding to the baseline point Sp1 in the baseline image G1 in the reference image G2. In the search unit 368, a phase only correlation (POC) computation method is used to search for the corresponding point corresponding to the baseline point Sp1 based on the frequency component associated with the region image included in the baseline region W1 and the frequency component associated with the reference region W2. The information processing device 3 thus operates as the corresponding point search device. In the search unit 368, the weighting is performed for every frequency by the weighting coefficient for every frequency set by the weighting setting unit 367 in the search processing of the corresponding point.

According to such weighting, the influence on the search result by the computation associated with the spatial frequency in which the contrast becomes lower in the MTF becomes smaller in the search processing of the corresponding point. As a result, the enhancement of the search precision of the corresponding point due to the improvement of the S/N ratio, and the increase in speed of the search of the corresponding point due to the reduction of the computation amount can be achieved. If the weighting coefficient is set for every spatial frequency according to the MTF specified for one or more image regions having a predetermined positional relationship with each baseline point Sp1 of the first to ninth image regions A1 to A9, the search processing of the corresponding point can be made more appropriate for every region where the baseline point Sp1 is positioned. In other words, the enhancement of the search precision of the corresponding point due to the improvement of the S/N ratio and the increase in speed of the search for the corresponding point due to the reduction of the computation amount can be achieved not uniformly but for every region where the baseline point Sp1 is positioned.

The search processing of the corresponding point using the POC computation method in the search unit 368 will now be described. In the search processing of the corresponding point, a correlation computation for obtaining a numerical value indicating a correlation degree (similarity degree) among the images is carried out using a signal of the phase component in which the amplitude component is suppressed of the frequency decomposition signal of the image pattern.

Figure 8:
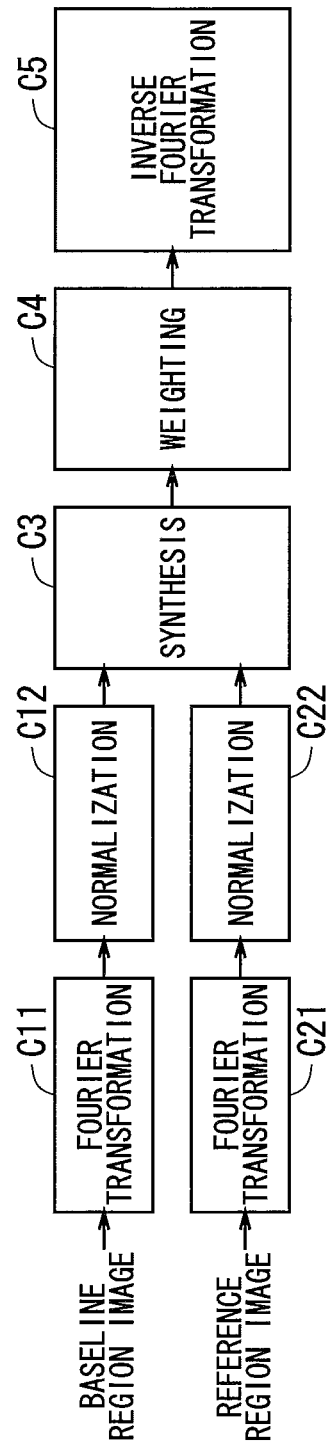
FIG. 8 is a view illustrating a computation flow in a search processing of a corresponding point according to one embodiment.

FIG. 8 is a view describing the search processing of the corresponding point using the POC computation method.

The baseline region W1 and the reference region W2 are handled as image regions in which a predetermined number $N_1$ of pixels are arrayed along the X direction, and a predetermined number $N_2$ of pixels are arrayed along the Y direction. Such image regions are expressed with the following equation 1.

$$f(n_1,n_2), \text{SIZE } N_1 \times N_2, n_1 = -M_1, \ldots, M_1$$

$$g(n_1,n_2), \text{SIZE } N_1 \times N_2, n_2 = -M_2, \ldots, M_2 \quad \text{[equation 1]}$$

$f(n_1, n_2)$ in equation 1 indicates the region image (also referred to as baseline region image) included in the baseline region W1, and $g(n_1, n_2)$ in equation 1 indicates the region image (also referred to as reference region image) included in the reference region W2. $N_1$ and $N_2$ are, for example, set to $N_1=2M_1+1$, $N_2=2M_2+1$.

First, a two-dimensional Fourier transformation processing C11, C21 using the arithmetic expression shown in equation 2 is performed on the baseline region image included in the baseline region W1 and the reference region image included in the reference region W2.

$$F(k_1, k_2) = \sum_{n_1, n_2} f(n_1, n_2) W_{N_1}^{k_1 n_1} W_{N_2}^{k_2 n_2} \quad \text{[Equation 2]}$$

$$G(k_1, k_2) = \sum_{n_1, n_2} g(n_1, n_2) W_{N_1}^{k_1 n_1} W_{N_2}^{k_2 n_2}$$

$$\text{WHERE, } W_p = \text{EXP}\left(-j\frac{2\pi}{P}\right), k_s = -M_s, \ldots, M_s$$

$N_1$, $N_2$ are substituted to the subscript P of W in the exceptional clause of equation 2, and 1 and 2 are substituted to the subscript s of k. $(k_1, k_2)$ indicates the two-dimensional spatial frequency.

Normalization processing C12, C22 for removing the amplitude component of the image is carried out using the arithmetic expression shown in the following equation 3 with respect to each region image performed with the Fourier transformation processing C11, C21.

$$F'(k_1, k_2) = \frac{F(k_1, k_2)}{|F(k_1, k_2)|}, G'(k_1, k_2) = \frac{G(k_1, k_2)}{|G(k_1, k_2)|} \quad \text{[equation 3]}$$

After the normalization processing C12, C22 is completed, a synthesizing processing C3 using the arithmetic expression shown in equation 4 is performed. $Wt(k_1, k_2)$ shown in equation 4 is a weighting coefficient corresponding to the spatial frequency $(k_1, k_2)$ set by the weighting setting unit 367. That is, a weighting processing C4 using the arithmetic expression shown in equation 4 is carried out.

$$R(k_1,k_2) = Wt(k_1,k_2) \cdot F'(k_1,k_2) \cdot \overline{G'(k_1,k_2)} \quad \text{[equation 4]}$$

Thereafter, two-dimensional inverse Fourier transformation processing C5 using the arithmetic expression shown in equation 5 is performed. The correlation computation between the images is thereby performed, and the result (POC value) is output.

$$r(k_1, k_2) = \frac{1}{N_1 N_2} \sum_{k_1, k_2} R(k_1, k_2) W_{N_1}^{-k_1 n_1} W_{N_2}^{-k_2 n_2} \quad \text{[equation 5]}$$

According to the processing described above, the computation result (POC value) indicating the correlation between the baseline region image associated with the baseline region W1 and the reference region image associated with the reference region W2 is obtained, and for example, the result (POC value) shown in FIG. 9, for example, is obtained.

In FIG. 9, the POC value for a location of high correlation in the rectangular image region in which a predetermined number $N_1$ of pixels are arrayed along the X direction, and a predetermined number $N_2$ of pixels are arrayed along the Y direction becomes large. The position corresponding to the peak Jc of the POC value in the reference region image associated with the reference region W2 is the corresponding point corresponding to the baseline point Sp1 in the reference image G2.

The POC values are discretely obtained. Thus, finer detection of the corresponding point can be carried out by performing the interpolation computation between the adjacent pixels, and estimating the position of the peak Jc at the size of the sub-pixel finer than the size of one pixel. The method of interpolation computation may be a method of obtaining a function of a parabola from the distribution of the POC values, which is discretely obtained, or the like.

According to the search processing of the corresponding point using the POC computation method, the position of the corresponding point in the reference image G2 as well as the shift amount (also referred to as disparity) between the position of the baseline point Sp1 in the baseline image G1 and the position of the corresponding point in the reference image G2 are detected in the search unit 368.

The distance calculation unit 369 calculates the distance from the first and second cameras 1, 2 to the portion captured at the baseline point Sp1 in the subject based on the search result by the search unit 368. Specifically, the distance is calculated using the technology of triangulation based on the shift amount between the position of the baseline point Sp1 in the baseline image G1 and the position of the corresponding point in the reference image G2, and the internal parameters and parameters of the first and second cameras 1, 2. The internal parameters include, for example, parameters indicating focal length of the optical systems 11, 21, center of image, tilt of imaging units 14, 24, and the like. The external parameters include, for example, parameters indicating positional relationship and postural relationship of the first camera 1 and the second camera 2, and the like.

<(3) Distance Measuring Operation>

Figure 11:
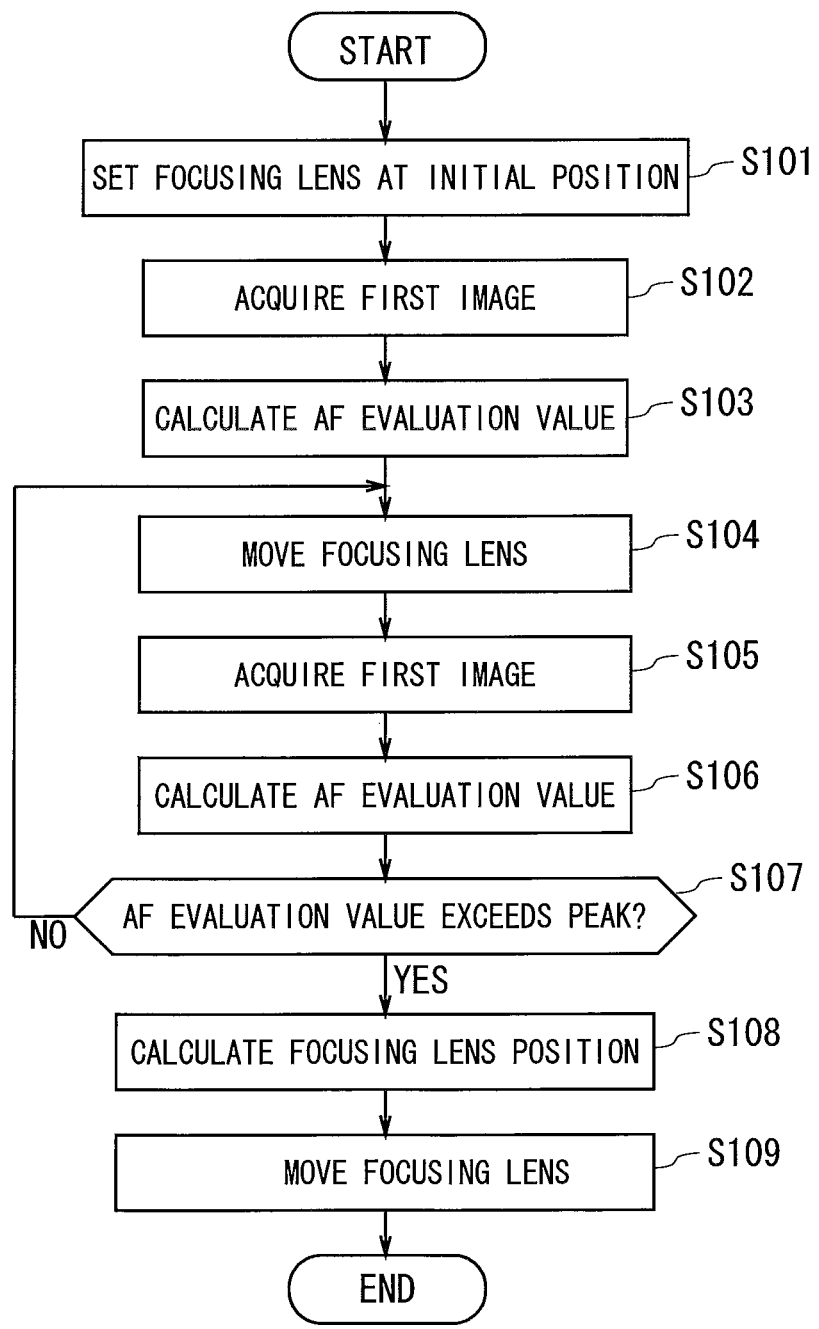
FIG. 11 is a flowchart illustrating an operation flow of a focusing operation.

FIG. 10 and FIG. 11 are flowcharts showing an example of a flow of the distance measuring operation in the distance measurement device 100. This flow is realized, for example, by the control of the control computation unit 16, the control unit 26, and the control unit 36.

First, in step S1, the operation (also referred to as focusing operation) in which the first camera 1 focuses on the subject is carried out. In step S1, for example, the operation flow shown in FIG. 11 is executed.

In the operation flow shown in FIG. 11, the focusing lens 11a is first set at the initial position by the control of the control computation unit 16 (step S101). Then, the first image is acquired by the imaging unit 14 (step S102). The evaluation value for every first to ninth image regions A1 to A9 is calculated by the evaluation value calculation unit 15 for the first image acquired in step S102, and the AF evaluation value is calculated based thereon (step S103). The focusing lens 11a is moved by a predetermined distance in one direction by the control of the control computation unit 16 (step S104). The first image is acquired by the imaging unit 14 (step S105). The evaluation value for every first to ninth image regions A1 to A9 is calculated by the evaluation value calculation unit 15 for the first image acquired in step S105, and the AF evaluation value is calculated based thereon (step S106).

Whether or not the AF evaluation value exceeds the peak is determined by the control computation unit 16 based on the AF evaluation values calculated in step S103 and step S106 (step S107). The processing of steps S104 to S107 are repeated until the AF evaluation value exceeds the peak. If the AF evaluation value exceeds the peak, the focusing lens position corresponding to the peak is calculated by the control computation unit 16. In this case, the focusing position information indicating the focusing lens position is transmitted from the control computation unit 16 to the control unit 26 of the second camera 2 and the information processing device 3. The focusing lens 11a is moved to the focusing lens position by the control of the control computation unit 16 (step S109). The focusing operation of step S1 is thereby completed. This is the AF adjustment of so-called hill climbing method.

In step S2, the focusing operation of the second camera 2 is carried out. The focusing lens 21a is moved to the focusing lens position corresponding to the focusing position information of the first camera 1 by the control of the control unit 26. Step S2 may be executed in parallel with step S109.

In step S3, the first and second focused images G1, G2 are acquired by the first and second cameras 1, 2.

In step S4, the evaluation value at the time of focusing is calculated for each image region A1 to A9 of the first focused image G1 acquired in step S3 by the evaluation value calculation unit 15.

In step S5, the focus state determination processing is carried out by the control computation unit 16. In the focus state determination processing, for example, determination is made on whether each of the first to ninth image regions A1 to A9 is in the front focus state or the rear focus state based on the evaluation value calculated for each first to ninth image regions A1 to A9 of each AF image acquired in the computations of steps S103 and S106 of step S1.

In step S6, the focusing information for each image region A1 to A9 is transformed to disparity according to the disparity table 341 by the disparity transformation unit 361.

In step S7, the first focused image G1 acquired in step S3 is assumed as the baseline image, and the baseline point Sp1 is set in the baseline image G1 by the initial disparity determination unit 362.

In step S8, the initial disparity associated with the baseline point Sp1 set in step S7 is determined based on the disparity obtained in step S6 by the initial disparity determination unit 362.

In step S9, the MTF corresponding to the evaluation value at the time of focusing calculated in step S4 is specified from the function table 342 by the function information specification unit 363.

In step S10, the size of the search window is set according to the MTF specified in step S9 by the size setting unit 364.

In step S11, the weighting coefficient is set for every spatial frequency according to the MTF specified in step S9 by the weighting setting unit 367.

In step S12, the baseline point Sp1 set in step S7 is assumed as a reference, and the baseline region W1 corresponding to the size of the search window set in step S10 is set in the baseline image G1 by the baseline region setting unit 365.

In step S13, the second focused image G2 is assumed as the reference image, and the reference region W2 is set in the reference image G2 by the reference region setting unit 366. In this case, the reference point Pp1 is set in the reference image G2 based on the position of the baseline point Sp1 set in step S7 in the baseline image G1 and the initial disparity determined in step S8. Assuming the reference point Pp1 as the reference, the reference region W2 corresponding to the size of the search window set in step S10 is set in the reference image G2.

In step S14, the corresponding point corresponding to the baseline point Sp1 in the baseline image G1 is searched for in the reference image G2 by the search unit 368. For example, the search for the corresponding point by the POC computation method using the weighting coefficient set in step S11 is carried out. According to the processing of step S14, the position of the corresponding point in the reference image G2 as well as the shift amount (also referred to as disparity) between the position of the baseline point Sp1 in the baseline image G1 and the position of the corresponding point in the reference image G2 are detected.

In step S15, the distance from the first and second cameras 1, 2 to the portion captured at the baseline point Sp1 in the subject is calculated based on the search result in step S14 by the distance calculation unit 369. In this case, the information indicating the distance associated with the baseline point Sp1 is stored in the storage unit 34.

In step S16, whether or not points (also referred to as distance measuring point) where the distance from the first and second cameras 1, 2 to the subject captured at the baseline point Sp1 is to be calculated are remaining in the baseline image G1 is determined by the initial disparity determination unit 362. If there are remaining distance measuring points, the processing is returned to step S7 and the processing of steps S7 to S16 are repeated until there are no remaining distance measuring points. If there are no remaining distance measuring points, the present operation flow is terminated.

<(4) Summary of One Embodiment>

As described above, in the information processing device 3 serving as the corresponding point search device according to one embodiment, the search range of the corresponding point is determined based on the position information (focusing position information) of the focusing lens 11a at the time of focusing of the first camera 1. Here, the search range of the corresponding point is narrowed using the fact that the rough distance from the first camera 1 to the subject is known by the AF adjustment. Thus, the corresponding point can be searched at high precision and at high speed between the baseline image G1 and the reference image G2. In the distance measurement device 100, the corresponding point can be searched at high precision and at high speed among the plurality of images, and consequently, the distance from the first and second cameras 1, 2 to the subject can be calculated at high precision and at high speed.

The search range can be made more appropriate by determining the search range of the corresponding point based on the evaluation value at the time of focusing indicating the focusing degree of the first camera 1 and the focusing position information.

The imaging apparatus that performs the AF adjustment of hill climbing method may be adopted as the first camera 1. The imaging apparatus having the general purpose AF adjustment function can be thereby used to search for the corresponding point at high precision and at high speed between the baseline image G1 and the reference image G2. As a result, the reduction in the manufacturing cost and the miniaturization of the information processing device 3 and the distance measurement device 100 can be achieved.

The evaluation values at the time of focusing are calculated for the first to ninth image regions A1 to A9 of the baseline image G1. The search range of the corresponding point is determined based on the evaluation value at the time of focusing and the front/rear focus information associated with one or more image regions having a predetermined positional relationship with the baseline point Sp1 of the first to ninth image regions A1 to A9, and the position information of the focusing lens 11a at the time of focusing. The search range is thus more appropriately determined not uniformly but for every region where the baseline point is positioned. As a result, the amount of information used in the computation of the search processing of the corresponding point is ensured for every region, and the search precision of the corresponding point can be appropriately maintained.

Furthermore, in the search processing of the corresponding point, the weighting is performed for every frequency according to the MTF specified from the focusing information of the first camera 1. The frequency component contained in the search range of the corresponding point can be roughly known by the MTF specified based on the focusing information. Thus, the weighting is performed for every frequency according to the MTF in the search processing of the corresponding point. As a result, the enhancement of the search precision of the corresponding point due to the improvement of the S/N ratio and the increase in speed of the search of the corresponding point due to the reduction of the computation amount can be achieved. That is, enhancement in robustness and increase in speed in the search processing of the corresponding point can be achieved.

<(5) Variant>

The present invention is not limited to the embodiment described above, and various changes, improvements, and the like can be made within a scope not deviating from the gist of the present invention.

For example, in the one embodiment described above, the focusing information associated with the first camera 1 includes information indicating the combination of the focusing position information for the first camera 1, and the data indicating the evaluation value at the time of focusing and the front/rear focus information for the first to ninth image regions A1 to A9, but this is not the sole case. For example, the focusing information associated with the first camera 1 may not include at least one of the evaluation value at the time of focusing and the front/rear focus information for the first to ninth image regions A1 to A9. Furthermore, for example, at least one of the setting of the size of the search window corresponding to the MTF and the weighting for every frequency corresponding to the MTF may not be performed. Moreover, for example, the search processing of the corresponding point using other computations such as the SAD computation method may be performed in place of the search processing of the corresponding point using the POC computation method.

A distance measurement device 100A according to one variant in which both the setting of the size of the search window corresponding to the MTF and the weighting for every frequency corresponding to the MTF are not performed, and the search processing of the corresponding point using the SAD computation method is performed will now be described.

<(5-1) One Variant>

Figure 12:
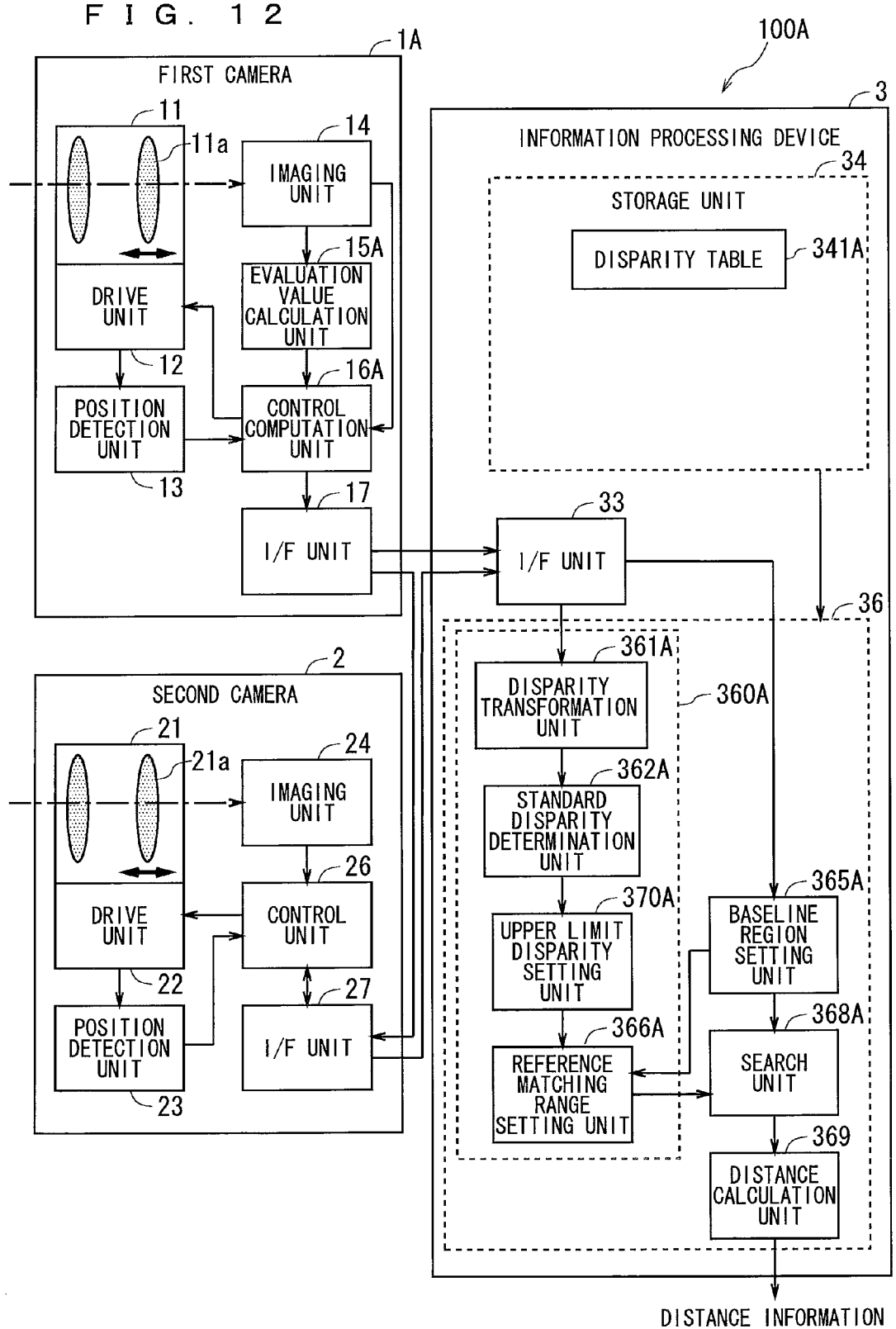
FIG. 12 is a block diagram showing a functional configuration of a distance measurement device according to one variant.

FIG. 12 is a block diagram showing a functional configuration of the distance measurement device 100A according to one variant. In FIG. 12, the functional configuration related to the distance measuring operation of measuring the distance from the first and second cameras 1A, 2 to the subject is shown.

In the distance measurement device 100A according to one variant, the first camera 1, the program PG and information stored in the storage unit 34, and the functional configurations realized by the control unit 36 in the distance measurement device 100 according to the one embodiment described above are changed.

Specifically, in the distance measurement device 100A, the first camera 1 is replaced with a first camera 1A including an evaluation value calculation unit 15A and a control computation unit 16A instead of the evaluation value calculation unit 15 and the control computation unit 16. The storage unit 34 stores a program PGA instead of the program PG, does not store the function table 342 and the size transformation formula 343, and stores a disparity table 341A instead of the disparity table 341. Furthermore, the search range determination unit 360 is changed to a search range determination unit 360A including a disparity transformation unit 361A, a standard disparity determination unit 362A, an upper limit disparity setting unit 370A, and a reference matching range setting unit 366A. The baseline region setting unit 365 and the search unit 368 are changed to a baseline region setting unit 365A and a search unit 368A.

A portion different from the distance measurement device 100 according to the one embodiment described above in the distance measurement device 100A according to one variant will be mainly described below.

The evaluation value calculation unit 15A differs from the evaluation value calculation unit 15 according to the one embodiment described above in that the evaluation value indicating the focusing degree of the first camera 1A with respect to the subject is calculated for the entire image region including the first to ninth image regions A1 to A9 shown in FIG. 3.

The control computation unit 16A serving as the focusing control unit performs the AF adjustment of so-called hill climbing method, similar to the control computation unit 16 according to the one embodiment described above. The control computation unit 16A differs from the control computation unit 16 according to the one embodiment described above in that the focus state determination processing is not performed, and the data indicating the evaluation value at the time of focusing for every first to ninth image regions A1 to A9 is not received from the evaluation value calculation unit 15A. Thus, the focusing information associated with the first camera 1A transmitted from the control computation unit 16A to the information processing device 3 does not include the evaluation value at the time of focusing and the front/rear focus information for the first to ninth image regions A1 to A9, but includes the focusing position information.

The disparity table 341A is a table in which the relationship of the focusing information associated with the first camera 1A and the disparity is described, similar to the disparity table 341 according to the one embodiment described above. However, the focusing information of the disparity table 341A differs from the disparity table 341 according to the one embodiment described above in that the evaluation value at the time of focusing and the front/rear focus information for the first to ninth image regions A1 to A9 are not included and the focusing position information merely needs to be included. Similar to the disparity table 341 according to the one embodiment described above, the disparity table 341A is obtained in advance through optical simulations using the optical design values of the first and second cameras 1A, 2, or experiments, for example.

The disparity transformation unit 361A transforms the focusing position information serving as the focusing information associated with the first camera 1A to disparity according to the disparity table 341A. In the disparity transformation unit 361A, the disparity corresponding to the focusing position information associated with the first camera 1A is recognized from the disparity table 341A.

Figure 13:
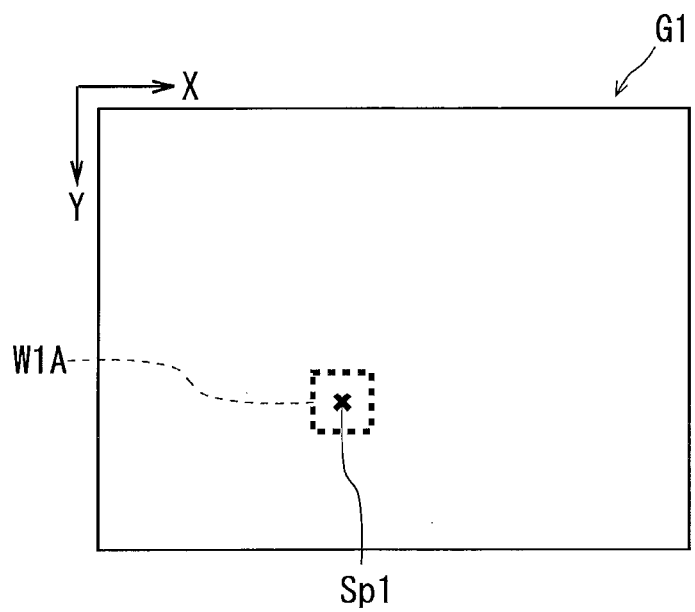
FIG. 13 is a view illustrating a setting mode of the baseline region with respect to the baseline image.

The standard disparity determination unit 362A determines the standard disparity for the search processing of the corresponding point between the first focused image G1 and the second focused image G2 based on the disparity obtained by the disparity transformation unit 361A. In the standard disparity determination unit 362A, for example, the first focused image G1 is assumed as the baseline image, the baseline point Sp1 is set in the baseline image G1, as shown in FIG. 13, and the disparity recognized by the disparity transformation unit 361A is determined as the standard disparity as is.

According to such configuration, the standard disparity can be determined even if the evaluation value at the time of focusing, the front/rear focus information, and the like are not obtained for every first to ninth image regions A1 to A9 as in the distance measurement device 100 according to the one embodiment described above. The standard disparity thus can be determined without barely adding another function to the imaging apparatus having the general purpose AF adjustment function. As a result, reduction in the manufacturing cost and miniaturization of the first camera 1A and the distance measurement device 100A can be achieved.

The upper limit disparity setting unit 370A sets the upper limit of the disparity (also referred to as upper limit disparity) defining the scanning range of the search window in the search processing of the corresponding point using the SAD computation method. For example, the upper limit disparity may be that in which a predetermined margin is added to the standard disparity set by the standard disparity determination unit 362A. The predetermined margin may be, for example, a fixed value such as a predetermined number of pixels, or the like, or may be a value that increases proportional to the standard disparity obtained by multiplying a predetermined value to the standard disparity.

The baseline region setting unit 365A sets a search window (also referred to as baseline region) W1A that becomes a reference in the baseline image G1. Specifically, as shown in FIG. 13, the baseline region W1A including the baseline point Sp1 is set with the baseline point Sp1 as a reference. The baseline region W1A may be an image region in which a predetermined number $N_1$ of pixels is arrayed along the X direction and a predetermined number $N_2$ of pixels is arrayed along the Y direction. The baseline region W1A is defined by the baseline point Sp1, and for example, may be set with the baseline point Sp1 as the center.

The reference matching range setting unit 366A assumes the second focused image G2 as the reference image, and sets the setting range of the region image to be matched with the baseline region image included in the baseline region W1A in the reference image G2. Specifically, the size of a reference region W2A having the same size as the reference region W1A is set, and one end Ps and the other end Pe of the range in which the reference point Pp1 defining the reference region W2A in the reference image G2 is set are set.

The direction in which the reference region W2A is scanned in the reference image G2 merely needs to be a direction corresponding to the direction in which the optical axis of the imaging lens of the first camera 1A and the optical axis of the imaging lens of the second camera 2 are spaced apart, and may be, for example, the X direction corresponding to the horizontal direction. One end Ps of the range in which the reference region W2A is scanned in the reference image G2 is set based on the upper limit disparity, for example. Specifically, the one end Ps is provided so that the shift amount between the position of the one end Ps in the reference image G2 and the position of the baseline point Sp1 in the baseline image G1 coincides with the upper limit disparity, for example. The other end Pe is provided so that the position of the other end Pe in the reference image G2 and the position of the baseline point Sp1 in the baseline image G1 coincide, for example, that is, so that the disparity becomes 0 (zero).

Accordingly, the range in which the reference region W2A is set in the reference image G2 is determined when searching for the corresponding point corresponding to the baseline point Sp1 in the reference image G2. That is, the range in which the reference image G2 is scanned with the reference region W2A, which is the search window, is determined.

Therefore, in the search range determination unit 360A, the search range in which the corresponding point is searched by the search unit 368A in the reference image G2 is determined based on the focusing position information.

The search unit 368A searches for the corresponding point corresponding to the baseline point Sp1 in the baseline image G1 in the reference image G2 using the SAD computation method. Thus, the information processing device 3 operates as the corresponding point search device. In the search unit 368A, the search processing of the corresponding point is carried out based on the search range determined by the search range determination unit 360A.

Figure 14:
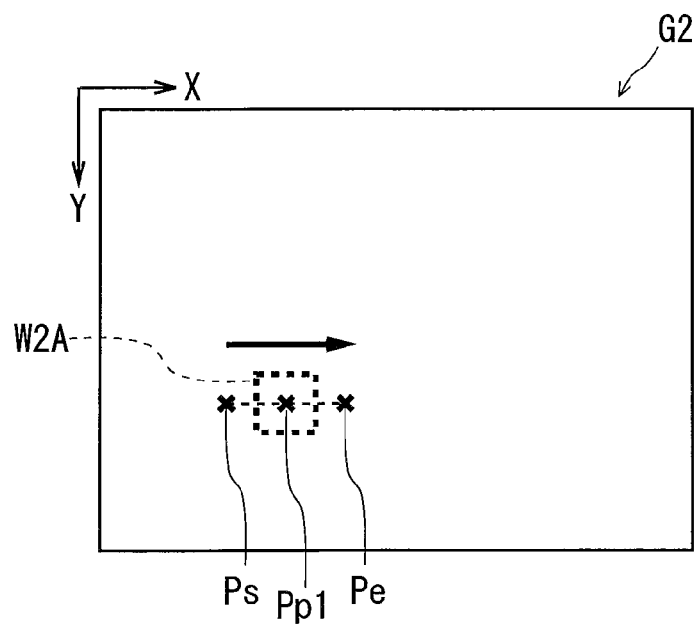
FIG. 14 is a view illustrating a setting mode of the reference region with respect to the reference image.

Specifically, if one baseline point Sp1 is set, a plurality of reference regions W2A is sequentially set with the reference point Pp1, which is set while being shifted by a predetermined pixel from one end Ps to the other end Pe in the reference image G2, as a reference, as shown in FIG. 14, in the search unit 368A. The predetermined pixel may be, for example, one pixel. The degree of correlation between the region image (also referred to as baseline region image) associated with the baseline region W1A of the baseline image G1 and the region image (also referred to as reference region image) associated with each reference region W2A of the reference image G2 is calculated by the correlation computation using the SAD computation method. In this case, the reference region image associated with the reference region W2A having the highest degree of correlation with respect to the baseline region image associated with the baseline region W1A is detected, and the reference point Pp1 defining the reference region W2A is detected as the corresponding point corresponding to the baseline point Sp1.

A specific method of the correlation computation using the SAD computation method will be described below. First, in the search unit 368A, the image data value (also referred to as baseline image data value) of each pixel configuring the baseline region image associated with the baseline region W1A is detected, and the image data value (also referred to as reference image data value) of each pixel configuring the reference region image associated with the reference region W2A is detected. An absolute value of the difference between the baseline image data value and the reference image data value is calculated for each pixel occupying the same position between the baseline region image and the reference region image. Furthermore, the absolute values of the difference calculated for each pixel are all added. At this time, the degree of correlation is higher the smaller the value after the addition, and illimitably approaches zero if the baseline region image and the reference region image are substantially the same image.

Figure 15:
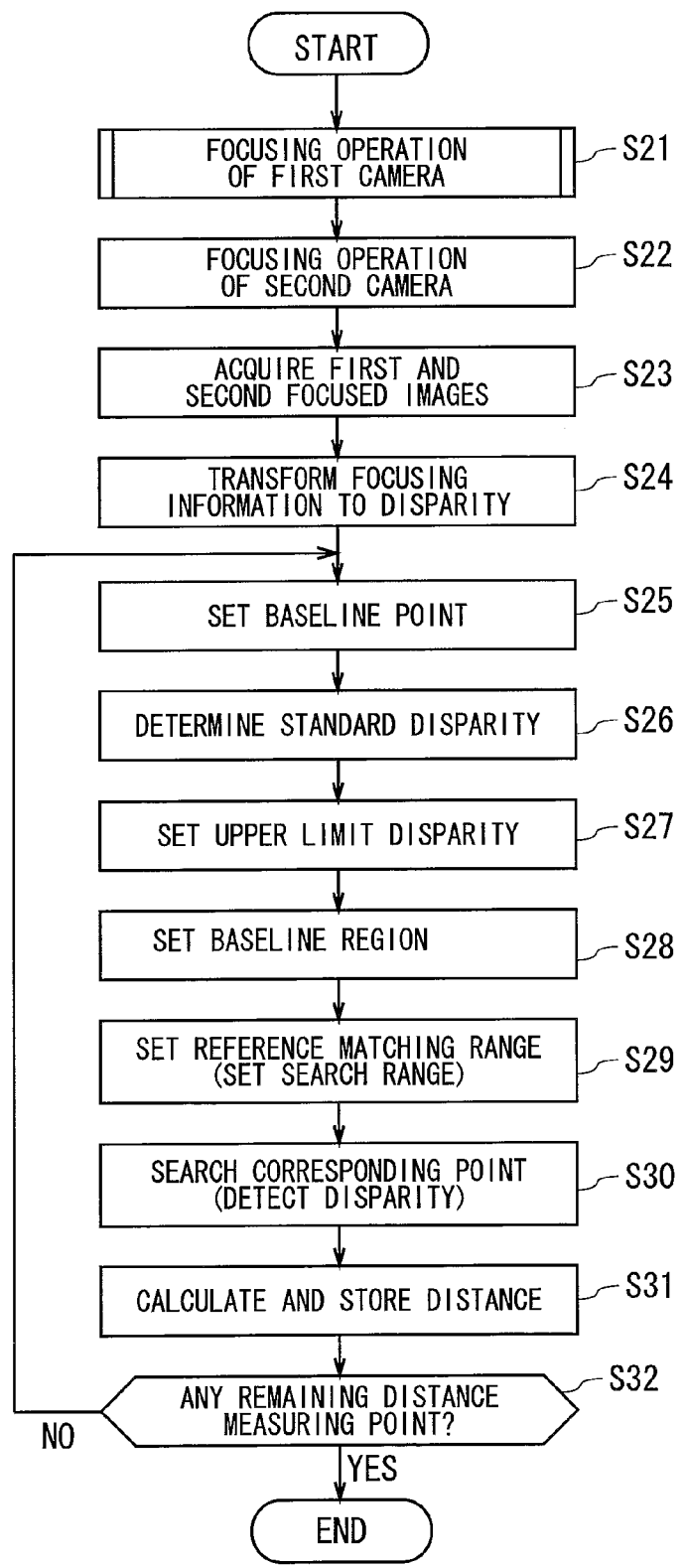
FIG. 15 is a flowchart illustrating a flow of the distance measuring operation according to one variant.

FIG. 15 is a flowchart showing a flow of the distance measuring operation in the distance measurement device 100A. The present flow can be realized by the control of the control computation unit 16A, the control unit 26, and the control unit 36, for example.

First, the focusing operation is carried out in the first camera 1 (step S21). In step S21, for example, the operation flow shown in FIG. 11 can be executed. In this case, the focusing position information indicating the focusing lens position is transmitted from the control computation unit 16A to the control unit 26 of the second camera 2 and the information processing device 3.

In step S22, the focusing operation of the second camera 2 is carried out. In this case, the focusing lens 21a is moved to the focusing lens position by the control of the control unit 26 based on the focusing position information obtained in step S21.

In step S23, the first and second focused images G1, G2 are acquired by the first and second cameras 1, 2.

In step S24, the focusing position information serving as the focusing information obtained in step S21 is transformed to disparity according to the disparity table 341A by the disparity transformation unit 361A.

In step S25, the first focused image G1 acquired in step S23 is assumed as the baseline image and the baseline point Sp1 is set in the baseline image G1 by the standard disparity determination unit 362A.

In step S26, the standard disparity associated with the baseline point Sp1 set in step S25 is determined based on the disparity obtained in step S24 by the standard disparity determination unit 362A.

In step S27, the upper limit disparity defining the scanning range of the search window in the search processing of the corresponding point is set based on the disparity obtained in step S24 by the upper limit disparity setting unit 370A.

In step S28, the baseline region W1A having the baseline point Sp1 set in step S25 as a reference is set in the baseline image G1 by the baseline region setting unit 365A.

In step S29, the second focused image G2 is assumed as the reference image, and the setting range of the region image to be matched with the baseline region image included in the baseline region W1A is set based on the upper limit disparity set in step S27 and the position where the disparity is 0 (zero) in the reference image G2 by the reference matching range setting unit 366A. The search range is thereby determined.

In step S30, the corresponding point corresponding to the baseline point Sp1 in the baseline image G1 is searched in the reference image G2 by the search unit 368A. Here, the search for the corresponding point by the SAD computation method is carried out based on the search range determined in step S29. The position of the corresponding point in the reference image G2 as well as the shift amount (also referred to as disparity) between the position of the baseline point Sp1 in the baseline image G1 and the position of the corresponding point in the reference image G2 is detected by the processing of step S30.

In step S31, the distance from the first and second cameras 1A, 2 to the portion captured at the baseline point Sp1 in the subject is calculated based on the search result of step S30 by the distance calculation unit 369. In this case, the information indicating the distance associated with the baseline point Sp1 is stored in the storage unit 34.

In step S32, whether or not points (also referred to as distance measuring point) where the distance from the first and second cameras 1A, 2 to the subject captured at the baseline point Sp1 is to be calculated are remaining in the baseline image G1 is determined by the standard disparity determination unit 362A. If there are remaining distance measuring points, the processing returns to step S25, and the processing of steps S25 to S32 are repeated until there are no remaining distance measuring points. If there are no distance measuring points, the present operation flow is terminated.

<(5-2) Other Variants>

In the one embodiment and the one variant described above, the focusing lens 11a plays the role of the movable portion movable in the optical axis direction, but is not limited thereto. For example, the imaging unit 14 may play the role of the movable portion movable in the optical axis direction instead of the focusing lens 11a, or both the focusing lens 11a and the imaging unit 14 may play the role of the movable portion movable in the optical axis direction. Furthermore, the imaging unit 24 may play the role of the movable portion movable in the optical axis direction instead of the focusing lens 21a, or both the focusing lens 21a and the imaging unit 24 may play the role of the movable portion movable in the optical axis direction.

In the one embodiment described above, a combination of the representative value related to the evaluation value at the time of focusing for the first to ninth image regions A1 to A9 and the focusing position information may be transformed to disparity in the disparity transformation unit 361. The representative value related to the evaluation value at the time of focusing may be an average value or a maximum value of the evaluation values at the time of focusing for the first to ninth image regions A1 to A9. In this case, the search range when searching for the corresponding point corresponding to each baseline point Sp1 can be determined based on the representative value related to the evaluation value at the time of focusing for the first to ninth image regions A1 to A9 and the focusing position information in the search range determination unit 360.

The representative value related to the evaluation value at the time of focusing may be obtained, for example, by computation such as interpolation, extrapolation, bilinear interpolation, or the like using the evaluation value at the time of focusing for one or more image regions having a predetermined positional relationship with the baseline point Sp1 of the first to ninth image regions A1 to A9, for example. The predetermined positional relationship merely needs to be, for example, positional relationship of being within a predetermined distance, or the like.

When such configuration is adopted, the corresponding point can be searched at high speed between the baseline image G1 and the reference image G2 due to the reduction of the computation amount.

Furthermore, in the one embodiment described above, the representative value of the disparities associated with the first to ninth image regions A1 to A9 obtained by the disparity transformation unit 361 may be determined as the initial disparity related to the baseline point Sp1 in the initial disparity determination unit 362. The representative value of the disparities may be an average value or a maximum value of the disparities associated with the first to ninth image regions A1 to A9, or may be an average value of the top N disparities (N is a natural number).

The average value, maximum value, or minimum value of the disparities obtained by the disparity transformation unit 361 for one or more image regions having a predetermined relationship with the baseline point Sp1 of the first to ninth image regions A1 to A9 in the baseline image G1 may be assumed as the initial disparity by the initial disparity determination unit 362. The initial disparity may be obtained by computation such as interpolation, extrapolation, bilinear interpolation, or the like using the disparity obtained by the disparity transformation unit 361 for one or more image regions having a predetermined positional relationship with the baseline point Sp1 of the first to ninth image regions A1 to A9, for example. The predetermined positional relationship merely needs to be, for example, the positional relationship of being within a predetermined distance, or the like.

In particular, if the minimum value of the disparities obtained by the disparity transformation unit 361 for one or more image regions having a predetermined positional relationship with the baseline point Sp1 of the first to ninth image regions A1 to A9 is assumed as the initial disparity, the search range is determined in the following manner. For example, it is assumed that M (M is an integer greater than or equal to two) image regions of the first to ninth image regions A1 to A9 satisfy the predetermined positional relationship with the baseline point Sp1. In this case, M disparity candidates between the baseline point Sp1 in the baseline image G1 and the corresponding point in the reference image G2 are obtained based on the evaluation value at the time of focusing associated with the M image regions and the focusing position information. The search range is determined based on the smallest disparity candidate of the M disparity candidates. If such configuration is adopted, the search range greatly deviated from the corresponding point is less likely to be set, and hence the search precision of the corresponding point stabilizes.

In the one embodiment described above, the weighting coefficient may be set for every frequency according to the MTF in which high contrast is maintained up to the highest spatial frequency of the MTFs associated with the first to ninth image regions A1 to A9 specified by the function information specification unit 363 in the weighting setting unit 367. Furthermore, the weighting coefficient may be set for every frequency according to the MTF in which high contrast is maintained up to the highest spatial frequency of the MTFs specified by the function information specification unit 363 for two or more image regions having a predetermined positional relationship with the baseline point Sp1 of the first to ninth image regions A1 to A9. When such configuration is adopted, the balance between the improvement of the S/N ratio and the reduction in the amount of information to use in the computation can be adjusted. In other words, the enhancement of the search precision of the corresponding point due to the improvement of the S/N ratio and the increase in speed of the search of the corresponding point due to the reduction of the computation amount can be made more appropriate.

In the one embodiment described above, nine image regions, the first to ninth image regions A1 to A9, are set as the calculation target of the evaluation value in the baseline image G1, but this is not the sole case. For example, the number of the image regions serving as the calculation targets of the evaluation value in the baseline image G1 merely needs to be two or more. Furthermore, the number of the image regions serving as the calculation targets of the evaluation value in the baseline image G1 may be one.

In the one embodiment described above, the initial disparity is determined based on the data indicating the evaluation value at the time of focusing, the front/rear focus information, and the focusing position information by the disparity transformation unit 361 and the initial disparity determination unit 362. In the one variant described above, the standard disparity is determined based on the focusing position information by the disparity transformation unit 361A and the standard disparity determination unit 362A. However, this is not the sole case. For example, the initial disparity or the standard disparity may be determined based on the data indicating the evaluation value at the time of focusing and the focusing position information. In this case, the disparity tables 341, 341A are to be tables in which the relationship of the combination of the evaluation value at the time of focusing and the focusing position information, and the disparity is described.

In the one embodiment and the one variant described above, the first focused image G1 is assumed as the baseline image serving as one image to become a reference when searching for the corresponding point, and the second focused image G2 is assumed as the reference image serving as the other image to be reference when searching for the corresponding point, but this is not the sole case. For example, the first focused image G1 may be assumed as the reference image serving as the other image to be referenced when searching for the corresponding point, and the second focused image G2 may be assumed as the baseline image serving as the one image to become a reference when searching for the corresponding point. In this case, for example, information such as whether or not the baseline point Sp1 set in the baseline image G2 is included in the image regions corresponding to the first to ninth image regions A1 to A9 of the baseline image G2, whether or not the baseline point Sp1 has a predetermined positional relationship with the image regions corresponding to the first to ninth image regions A1 to A9, and the like, can be used in the computation.

In the one embodiment and the one variant described above, the AF adjustment is carried out in the first camera 1, 1A, but this is not the sole case. For example, the focusing operation in which the adjustment of the focus is carried out by manual operation may be executed in the first camera 1, 1A.

In the one embodiment and the one variant described above, two cameras are arranged, but this is not the sole case. For example, the third camera may be added. In this case, the image imaged with the third camera may be assumed as a second reference image, and the search processing of the corresponding point may be carried out, similar to the one embodiment and the one variant described above, based on the baseline image and the second reference image. The distance from the three cameras to the subject may be calculated based on the average value of the two disparities obtained for one baseline point Sp1 by the search processing of the corresponding point.

The shift amount (disparity) closer to the initial disparity (or standard disparity) of the shift amount between the baseline point Sp1 in the baseline image G1 and the corresponding point in the reference image G2 and the shift amount between the baseline point Sp1 in the baseline image G1 and the corresponding point in the second reference image may be adopted. In this case, the distance from the three cameras to the subject can be calculated based on the adopted shift amount (disparity). If the third camera is arranged spaced apart from the first camera 1 (1A) in a direction different from the direction in which the first camera 1 (1A) and the second camera 2 are spaced apart, the robustness in the calculation of the distance from the three cameras to the subject can be enhanced regardless of the shape of the subject. A fourth and more cameras may be added. In other words, two or more cameras merely need to be arranged. According to such configuration, the corresponding point can be searched at high precision and at high speed for the plurality of images.

In the one embodiment and the one variant described above, the focusing operation is carried out in both the first camera 1 (1A) and the second camera 2, but this is not the sole case. For example, the focusing operation may not be carried out and a so-called pan focus in which the focus is fixed may be adopted in the second camera 2. The calculation precision of the distance from the first and second cameras 1 (1A), 2 to the subject thus lowers, but reduction in the manufacturing cost and miniaturization of the distance measurement device 100, 100A can be achieved by the simplification of the configuration.

The POC computation method is used in the search processing of the corresponding point in the one embodiment described above, but this is not the sole case. For example, a rotation invariant POC (RIPOC) may be used. Furthermore, the SAD computation method is used in the search processing of the corresponding point in the one variant described above, but this is not the sole case, and other computation methods such as SSD (Sum of Squared intensity Difference) computation method, normalized cross-correlation method, and the like, for example, may be used.

In the one embodiment and the one variant described above, the search processing of the corresponding point between a set of images, the baseline image G1 and the reference image G2, is simply carried out, but this is not the sole case. For example, plural sets of images having different resolutions may be generated for the baseline image G1 and the reference image G2 to obtain a hierarchical structure by resolution, and the processing in which the correlation computation between the images of each layer is sequentially carried out from the upper level layer of low resolution toward the lower level layer of high resolution may be executed for each baseline point Sp1. In the relevant processing, for example, the search range in the next layer may be set based on the disparity obtained by performing the search processing of the corresponding point similar to the one embodiment and the one variant described above for the upper level layer of lowest resolution.

In the distance measurement device 100, 100A of the one embodiment and the one variant described above, the distance calculation unit 369 is arranged inside the information processing device 3 operating as the corresponding point search device, but is not limited thereto. For example, the distance calculation unit 369 may be arranged exterior to the information processing device 3 operating as the corresponding point search device. In this case, the distance calculation unit 369, for example, may be realized in a different information processing device connected to the information processing device 3 so as to be data transmittable/receivable.

In the one embodiment and the one variant described above, the search range of the corresponding point is determined based on the position information from the movable portion at the time of focusing of the imaging apparatus, but this is not the sole case, and the search range of the corresponding point may be determined based on the prediction information of the focusing position from the imaging apparatus at the time of non-focusing. In this case, the AF adjustment in a method capable of predicting the focusing position such as phase difference method, and the like, for example, may be performed instead of the AF adjustment of the so-called hill climbing method in the imaging apparatus.

It should be recognized that all or one part configuring the one embodiment and the various variants described above can be appropriately combined within a non-conflicting scope.

DESCRIPTION OF REFERENCE SIGNS 1, 1A first camera
2 second camera
3 information processing device
100, 100A distance measurement device
11, 21 optical system
11a, 21a focusing lens
12, 22 drive unit
13, 23 position detection unit
14, 24 imaging unit
15, 15A evaluation value calculation unit
16, 16A control computation unit
26, 36 control unit
34 storage unit
341, 341A disparity table
342 function table
343 size transformation formula
360, 360A search range determination unit
361, 361A disparity transformation unit
362 initial disparity determination unit
362A standard disparity determination unit
363 function information specification unit
364 size setting unit
365, 365A baseline region setting unit
366 reference region setting unit
366A reference matching range setting unit
367 weighting setting unit
368, 368A search unit
369 distance calculation unit
370A upper limit disparity setting unit

The invention claimed is:

1. A corresponding point search device comprising:
an information acquiring unit that acquires a first image obtained by imaging a subject with a first imaging apparatus in a focused state, in which the first imaging apparatus is focused on the subject by moving of a movable portion including at least one of an optical system and an imaging unit, a second image obtained by imaging the subject with a second imaging apparatus from a view point different from the first imaging apparatus, and position information of the movable portion when the first imaging apparatus is in the focused state;

a search unit that searches for a corresponding point corresponding to a baseline point in one image in the other image for the one image and the other image of the first image and the second image;

a search range determination unit that determines a search range in which the corresponding point is searched by the search unit in the other image based on the position information;

an evaluation value calculation unit that calculates an evaluation value at the time of focusing indicating a focusing degree of the first imaging apparatus with respect to the subject for one or more image regions in a focused image using data of the focused image obtained by the imaging unit when the first imaging apparatus is in the focused state, wherein the search range determination unit determines the search range based on the position information and the evaluation value at the time of focusing; and a function information specification unit that specifies information of an optical transfer function corresponding to the evaluation value at the time of focusing calculated by the evaluation value calculation unit from relational information indicating a relationship of the evaluation value at the time of focusing and the information of the optical transfer function associated with the optical system, wherein the search unit performs search processing of searching for the corresponding point based on a frequency component associated with a baseline region including the baseline point in the one image and a frequency component associated with a reference region in the other image, performs weighting for every frequency and performs computation according to the information of the optical transfer function specified by the function information specification unit in the search processing, and wherein the search range includes the reference region in the other image.

2. The corresponding point search device according to claim 1, further comprising the first imaging apparatus, and the second imaging apparatus.

3. The corresponding point search device according to claim 1, wherein
the evaluation value calculation unit calculates a plurality of evaluation values indicating a focusing degree of the first imaging apparatus with respect to the subject using data of a plurality of images, each being obtained by the imaging unit in each state in which the movable portion is sequentially arranged at a plurality of positions; and
the corresponding point search device further comprising:
a focusing control unit that sets the first imaging apparatus in the focused state by moving the movable portion based on the plurality of evaluation values.

4. The corresponding point search device according to claim 1, wherein
the evaluation value calculation unit calculates the evaluation value at the time of focusing indicating a focusing degree of the first imaging apparatus with respect to the subject for a plurality of image regions included in the focused image using data of the focused image;
the function information specification unit specifies information of the optical transfer function corresponding to each the evaluation value at the time of focusing calculated by the evaluation value calculation unit for each the image region from the relational information; and
the search unit performs the weighting for every frequency according to the information of the optical transfer function specified by the function information specification unit for at least one image region having a predetermined positional relationship with the baseline point of the plurality of image regions in the search processing.

5. The corresponding point search device according to claim 4, wherein
the predetermined positional relationship includes a positional relationship of being within a predetermined distance from the baseline point;
the at least one image region includes two or more image regions; and
the search unit performs the weighting for every frequency according to the information of the optical transfer function in which high contrast is maintained up to the highest frequency of the information of the optical transfer function respectively specified by the function information specification unit for the two or more image regions in the search processing.

6. A corresponding point search device comprising:
an information acquiring unit that acquires a first image obtained by imaging a subject with a first imaging apparatus in a focused state, in which the first imaging apparatus is focused on the subject by moving of a movable portion including at least one of an optical system and an imaging unit, a second image obtained by imaging the subject with a second imaging apparatus from a view point different from the first imaging apparatus, and position information of the movable portion when the first imaging apparatus is in the focused state;
a search unit that searches for a corresponding point corresponding to a baseline point in one image in the other image for the one image and the other image of the first image and the second image;
a search range determination unit that determines a search range in which the corresponding point is searched by the search unit in the other image based on the position information;
an evaluation value calculation unit that calculates an evaluation value at the time of focusing indicating a focusing degree of the first imaging apparatus with respect to the subject for one or more image regions in a focused image using data of the focused image obtained by the imaging unit when the first imaging apparatus is in the focused state, wherein the search range determination unit determines the search range based on the position information and the evaluation value at the time of focusing; and
a function information specification unit that specifies information of an optical transfer function corresponding to the evaluation value at the time of focusing calculated by the evaluation value calculation unit from relational information indicating a relationship of the evaluation value at the time of focusing and the information of the optical transfer function associated with the optical system, wherein
the search unit searches for the corresponding point based on a frequency component associated with a baseline region including the baseline point in the one image and a frequency component associated with a reference region in the other image;
the search range includes the reference region of the other image; and
the search range determination unit determines sizes of the baseline region and the reference region according to the information of the optical transfer function specified by the function information specification unit.

7. The corresponding point search device according to claim 1, wherein the evaluation value calculation unit calculates an evaluation value at the time of focusing indicating a focusing degree of the first imaging apparatus with respect to the subject for a plurality of image regions included in the focused image using data of the focused image; and the search range determination unit determines the search range based on the evaluation value at the time of focusing calculated by the evaluation value calculation unit for at least one image region having a predetermined positional relationship with the baseline point of the plurality of image regions, and the position information.

8. The corresponding point search device according to claim 7, wherein the predetermined positional relationship includes a positional relationship of being within a predetermined distance from the baseline point;

the at least one image region includes two or more image regions; and the search range determination unit obtains two or more disparity candidates between the baseline point in the one image and the corresponding point in the other image based on the evaluation value at the time of focusing calculated by the evaluation value calculation unit for the two or more image regions and the position information, and determines the search range based on a smallest disparity candidate of the two or more disparity candidates.

9. The corresponding point search device according to claim 1, wherein the evaluation value calculation unit calculates an evaluation value at the time of focusing indicating a focusing degree of the first imaging apparatus with respect to the subject for a plurality of image regions included in the focused image using data of the focused image; and the search range determination unit determines the search range based on a representative value related to the plurality of evaluation values at the time of focusing calculated by the evaluation value calculation unit for the plurality of image regions and the position information.

10. A distance measurement device comprising:

a corresponding point search device comprising:

an information acquiring unit that acquires a first image obtained by imaging a subject with a first imaging apparatus in a focused state, in which the first imaging apparatus is focused on the subject by moving of a movable portion including at least one of an optical system and an imaging unit, a second image obtained by imaging the subject with a second imaging apparatus from a view point different from the first imaging apparatus, and position information of the movable portion when the first imaging apparatus is in the focused state;

a search unit that searches for a corresponding point corresponding to a baseline point in one image in the other image for the one image and the other image of the first image and the second image;

a search range determination unit that determines a search range in which the corresponding point is searched by the search unit in the other image based on the position information;

an evaluation value calculation unit that calculates an evaluation value at the time of focusing indicating a focusing degree of the first imaging apparatus with respect to the subject for one or more image regions in a focused image using data of the focused image obtained by the imaging unit when the first imaging apparatus is in the focused state, wherein the search range determination unit determines the search range based on the position information and the evaluation value at the time of focusing; and a function information specification unit that specifies information of an optical transfer function corresponding to the evaluation value at the time of focusing calculated by the evaluation value calculation unit from relational information indicating a relationship of the evaluation value at the time of focusing and the information of the optical transfer function associated with the optical system, wherein the search unit performs search processing of searching for the corresponding point based on a frequency component associated with a baseline region including the baseline point in the one image and a frequency component associated with a reference region in the other image, performs weighting for every frequency and performs computation according to the information of the optical transfer function specified by the function information specification unit in the search processing, and wherein the search range includes the reference region in the other image; and a distance calculation unit, arranged inside or outside the corresponding point search device, that calculates a distance from the first and second imaging apparatuses to a portion captured at the baseline point in the subject based on a shift amount of a position of the baseline point in the one image and a position of the corresponding point in the other image, and a parameter associated with the setting of the first and second imaging apparatuses.

* * * * *